(12) United States Patent
Kashima et al.

(10) Patent No.: US 7,859,622 B2
(45) Date of Patent: Dec. 28, 2010

(54) RETARDATION LAYER AND LIQUID CRYSTAL DISPLAY APPARATUS USING THE SAME

(75) Inventors: Keiji Kashima, Tokyo-to (JP); Takashi Kuroda, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 12/749,846

(22) Filed: Mar. 30, 2010

(65) Prior Publication Data

US 2010/0182545 A1    Jul. 22, 2010

Related U.S. Application Data

(63) Continuation of application No. 10/563,280, filed as application No. PCT/JP2004/010591 on Jul. 20, 2004, now Pat. No. 7,719,643.

(30) Foreign Application Priority Data

Jul. 17, 2003    (JP)    ............................... 2003-276308

(51) Int. Cl.
    *G02F 1/1335*    (2006.01)
(52) U.S. Cl. ..................... 349/117; 349/18; 349/118; 349/119; 349/120; 349/175; 349/185; 349/187
(58) Field of Classification Search ................. 349/18, 349/117, 118, 119, 120, 175, 185, 187
    See application file for complete search history.

(56) References Cited

U.S. PATENT DOCUMENTS

| | | | | |
|---|---|---|---|---|
| 5,619,352 | A | * | 4/1997 | Koch et al. .................... 349/89 |
| 5,989,461 | A | * | 11/1999 | Coates et al. ................ 252/585 |
| 6,175,400 | B1 | * | 1/2001 | Duncan et al. .............. 349/117 |
| 6,867,834 | B1 | * | 3/2005 | Coates et al. ............... 349/119 |
| 6,903,789 | B1 | * | 6/2005 | Cutler et al. ................ 349/119 |
| 6,912,030 | B1 | * | 6/2005 | Coates et al. ............... 349/119 |

(Continued)

FOREIGN PATENT DOCUMENTS

CN    1186966 A    7/1998

(Continued)

OTHER PUBLICATIONS

Y. Iimura, et al; "44.1: *Invited Address*: Electro-Optic Characteristics of Amorphous and Super-Multidomain TN-LCDs Prepared by a Non-Rubbing Method", SID 94 Digest, pp. 915-918, 1994 (exact date not given).

(Continued)

*Primary Examiner*—Brian M. Healy
*Assistant Examiner*—Guy G Anderson
(74) *Attorney, Agent, or Firm*—Ladas & Parry LLP

(57) ABSTRACT

The present invention provides a retardation layer capable of effectively restraining the display quality deterioration without generating a bright and dark pattern in the display image even when a retardation layer is disposed in between a liquid crystal cell and a polarizing plate.

The retardation layer comprises a plurality of minute units (domains) having molecular structure of cholesteric structure. Moreover, in the retardation layer, the helical pitch of the molecular structure is adjusted such that the selective reflected wavelength of the selected reflected light deriving from the molecular structure is shorter than the wavelength of the incident light on the retardation layer.

25 Claims, 10 Drawing Sheets

U.S. PATENT DOCUMENTS

| | | | |
|---|---|---|---|
| 7,126,754 B2 * | 10/2006 | Yamaoka et al. | 359/485 |
| 7,169,448 B2 * | 1/2007 | Coates et al. | 428/1.1 |
| 7,719,643 B2 | 5/2010 | Kashima et al. | |
| 2002/0130994 A1 | 9/2002 | Karman | |
| 2003/0142256 A1 | 7/2003 | Maeda et al. | |

FOREIGN PATENT DOCUMENTS

| | | |
|---|---|---|
| EP | 0 632 311 A1 | 1/1995 |
| JP | 03-067219 A | 3/1991 |
| JP | 04-322223 A | 11/1992 |
| JP | 07-175058 A | 7/1995 |
| JP | 07-175065 A | 7/1995 |
| JP | 08-292432 A | 11/1996 |
| JP | 09-054315 A | 2/1997 |
| JP | 10-177348 A | 6/1998 |
| JP | 2001-188125 A | 7/2001 |
| JP | 2002-258053 A | 9/2002 |
| JP | 2002-338575 A | 11/2002 |
| JP | 2003-084131 A | 3/2003 |
| WO | 02/50581 A1 | 6/2002 |

OTHER PUBLICATIONS

Y. Toko, et al; "P-49: TN-LCDs Fabricated by Non-Rubbing Showing Wide and Homogeneous Viewing Angular Characteristics and Excellent Voltage Holding Ratio", SID 93 Digest, pp. 622-625, 1993. (exact date not given).
International Search Report PCT/JP2004/010591.
USPTO OA mailed Mar. 11, 2008 for U.S. Appl. No. 10/563,280.
USPTO OA mailed Jul. 10, 2008 for U.S. Appl. No. 10/563,280.
USPTO OA mailed Jul. 7, 2009 for U.S. Appl. No. 10/563,280.

* cited by examiner

LIGHT

BACK LIGHT SIDE

RETARDATION LAYER AND LIQUID CRYSTAL DISPLAY APPARATUS USING THE SAME

TECHNICAL FIELD

The present invention relates to a retardation layer which is used being incorporated in a liquid crystal display apparatus or the like. In particular, the present invention relates to a retardation layer comprising a retardation layer to function as a negative C plate of a cholesteric regularity, for compensating the polarizing state of a light in a direction inclined with respect to the normal of a liquid crystal cell, and a liquid crystal display apparatus comprising a retardation layer.

BACKGROUND ART

As a conventional common liquid crystal display apparatus, as shown in FIG. 15, one comprising a polarizing plate 102A on the incident side, a polarizing plate 102B on the output side, and a liquid crystal cell 104 can be presented. The polarizing plates 102A and 102B are constituted so that only a linearly polarized light (it is shown schematically by an arrow in the figure) having a vibration surface in a predetermined vibration direction is selectively transmitted, and they are provided facing to each other in the crossed Nicol state so that each of their vibration direction is perpendicular with each other. Moreover, the liquid crystal cell 109 comprises a large number of cells corresponding to the pixels, and is disposed in between the polarizing plates 102A and 102B.

Here, in such liquid crystal display apparatus 100, a case of employing VA (vertical alignment) system, wherein a nematic liquid crystal having a negative dielectric anisotropy is sealed in the liquid crystal cell 104 (in the figure, the liquid crystal director is shown schematically with dot lines), will be presented for an example. When the linearly polarized light, which has been transmitted through the incident side polarizing plate 102A, is transmitted through a portion of non-driven state cell, among the liquid crystal cell 104, its phase is not shifted, so as to be blocked by the output side polarizing plate 102B. On the other hand, when it is transmitted through a portion of the driven state cell, among the liquid crystal cell 104, the phase of the linearly polarized light is shifted so that a quantity of light corresponding to the phase shift amount is transmitted through the output side polarizing plate 102B, so as to be output. Thereby, by optionally controlling the driving voltage of the liquid crystal cell 104 per each cell, a desired image can be displayed on the output side polarizing plate 102B side. The liquid crystal display apparatus 100 is not limited to those having the above-mentioned aspect of the light transmission and blockage. A liquid crystal display apparatus having the configuration in which the output light from a portion of the non-driven state cell, among the liquid crystal cell 104, is transmitted through the output side polarizing plate 102B so as to be output, whereas the output light from a portion of the driven state cell is blocked by the output side polarizing plate 102B has also been proposed.

Considering the case in which the linearly polarized light is transmitted through a portion of the non-driven state cell, among the above-mentioned VA system liquid crystal cell 104, the liquid crystal cell 104 has a birefringence so that the refractive index in the thickness direction and the refractive index in the plane direction differ with each other. Therefore, among the linearly polarized light transmitted through the incident side polarizing plate 102A, the incident light along the normal line of the liquid crystal cell 104 is transmitted through the same without being its phase shifted. However, among the linearly polarized light transmitted through the incident side polarizing plate 102A, the phase of the incident light in the direction inclined with respect to the normal line of the liquid crystal cell 104 is shifted when transmitting the liquid crystal cell 104, so as to be elliptically polarized. This phenomenon derives from the function of the liquid crystal molecules, aligned in the vertical direction in the liquid crystal cell 104, as a positive C plate. The size of the generated phase difference with respect to the light (transmitted light) transmitted through the liquid crystal cell 104 is influenced by the birefringence value of the liquid crystal molecules sealed in the liquid crystal cell 104, the thickness of the liquid crystal cell 104, the wavelength of the transmitted light, or the like.

Due to the above-mentioned phenomenon, even when a cell in the liquid crystal cell 104 is in the non-driven state so that a linearly polarized light is inherently to be transmitted as it is and blocked by the output side polarizing plate 102B, a part of the output light, which is in a direction inclined with respect to the normal line of the liquid crystal cell 104, is leaked from the output side polarizing plate 102B.

Therefore, in the above-mentioned conventional liquid crystal display apparatus 100, a problem is involved in that the display quality of an image observed from a direction inclined with respect to the normal line of the liquid crystal cell 104 is deteriorated mainly due to the contrast deterioration, compared with an image observed form the front side (problem of viewing angle dependency).

In order to improve the problem of viewing angle dependency in the above-mentioned conventional liquid crystal display apparatus 100, various techniques have been developed so far. As one of them, for example as it is disclosed in Japanese Patent Application Laid Open (JP-A) Nos. 3-67219 or 4-322223, a liquid crystal display apparatus, in which the optical compensation is carried out by using a retardation layer (retardation layer showing the birefringence) having a cholesteric regularity molecular structure and disposing such retardation layer in between a liquid crystal cell and a polarizing plate, is known.

Here, in a retardation optical element having a cholesteric regularity molecular structure, a selective reflected wavelength represented by λ=nav·p (p: helical pitch in the helical structure of the liquid crystal molecules, nav: average refractive index in the plane orthogonal to the helical axis) is adjusted, for example as disclosed in JP-A Nos. 3-67219 or 4-322223, so as to be smaller than or larger than the wavelength of the transmitted light.

In the retardation optical element as mentioned above, as in the case of the above-mentioned liquid crystal cell, the phase of the incident linearly polarized light, in a direction inclined with respect to the normal line of the retardation layer, is shifted when transmitting the retardation layer so as to be elliptically polarized. This phenomenon derives from the function of the cholesteric regularity molecular structure as a negative C plate. The size of the phase difference generated with respect to the transmitted light through the retardation layer (transmitted light) is influenced by the birefringence value of the liquid crystal molecules in the retardation layer, the thickness of the retardation layer, the wavelength of the transmitted light, or the like.

Therefore, by use of the above-mentioned retardation optical element, by optionally designing the retardation layer such that the phase difference generated by the liquid crystal cell of the VA system, which acts as a positive C plate, and the phase difference generated in the retardation layer, which acts as a negative C plate, can be offset, the problem of the viewing angle dependency of the liquid crystal display apparatus can dramatically be improved.

On the other hand, in JP-A No. 7-175065, a liquid crystal display comprising a large number of micro domains, of about several μm to several tens μm diameter, that are not fixed is disclosed as a liquid crystal cell of the TN (twisted nematic) system. A chiral nematic liquid crystal layer used as a TN liquid crystal is designed so as to function as an optical rotation layer, not to function as a retardation layer. Therefore, the twist angle of the above-mentioned TN liquid crystal is designed such that the twist angles of the above-mentioned large number of micro domains are same in a range of 0 degree to about 270 degrees (0 to 0.75 pitch when converted to the chiral pitch). In, the case the chiral pitch of the TN liquid crystal is presumed to be 1 or more pitches, the selective reflected wavelength of the TN liquid crystal is longer than the wavelength of an incident visible light.

In SID '93 Digest, 622 (1993), R. Holding et al. discloses, similarly as a liquid crystal cell forming method of the TN system, a liquid crystal display comprising a liquid crystal layer, in an amorphous state, which is not fixed. A chiral nematic liquid crystal layer used as a TN liquid crystal is designed so as to function as an optical rotation layer, not to function as a retardation layer. Therefore, the twist angle of the above-mentioned TN liquid crystal is designed to be 90 degrees (0.5 pitch when converted to the chiral pitch). The TN system includes a normally black mode in which a TN cell is interposed between two polarizing plates with the absorption axes provided parallel, and a normally white mode in which a TN cell is interposed between polarizing plates cross Nicol. According to SID '93 Digest, 622 (1993) by R. Holding et al., when TN liquid crystal display comprising a liquid crystal layer, in an amorphous state, which is not fixed is made into a normally black mode, the transmission is as much as 3% so as to induce the contrast deterioration. In the case the chiral pitch of the TN liquid crystal is presumed to be 1 or more pitches, the selective reflected wavelength of the TN liquid crystal is longer than the wavelength of an incident visible light.

In also SID '94 Digest, 915 (1994), Y. Iimura et al. disclose, similarly as a liquid crystal cell forming method of the TN system, a liquid crystal display comprising a liquid crystal layer in an amorphous state. The above-mentioned liquid crystal layer in the amorphous state has a 10 to 100 μm brush width, with several domains present therebetween, and the directors of the adjacent domains are substantially continuous. A chiral nematic liquid crystal layer used as a TN liquid crystal is designed so as to function as an optical rotation layer, not to function as a retardation layer. Therefore, the twist angle of the above-mentioned TN liquid crystal is designed to be 90 degrees (0.5 pitch when converted to the chiral pitch). In the case the chiral pitch of the TN liquid crystal is presumed to be 1 or more pitches, the selective reflected wavelength of the TN liquid crystal is longer than the wavelength of an incident visible light.

Moreover, JP-A No. 2002-258053 discloses a mono-domain circularly polarized light extracting optical element in which directors of liquid crystal molecules, in the entire range of the liquid crystal layer surface having cholesteric regularity, are coincident. Thereby, the bright and dark pattern, observed at the time of interposing the cholesteric liquid crystals between the polarizing plates in a cross Nicol state, is dissolved.

However, in the case the above-mentioned retardation optical element (retardation layer having the molecular structure of the cholesteric regularity) is disposed between the liquid crystal cell and the polarizing plate, even though the problem of viewing angle dependency can be improved, there is a problem that a bright and dark pattern is generated in the displayed image and that the display quality is extremely deteriorated, except the case of JP-A No. 2002-258053.

DISCLOSURE OF THE INVENTION

The present invention has been achieved in consideration to the above-described problems. The object thereof is to provide a retardation layer capable of effectively restraining the display quality deterioration without generating a bright and dark pattern in a display image, even when a retardation layer is disposed in between a liquid crystal cell and a polarizing plate. Also, to provide a retardation optical element and a liquid crystal display apparatus using the retardation layer.

To achieve the above-described invention, the present invention provides a retardation layer having a fixed cholesteric structure, which functions as a negative C plate, and is characterized in that, at least on one surface of two major surfaces of the retardation layer, liquid crystal molecules, whose directors are not substantially coincident, exist within a predetermined interval.

In the retardation layer of the present invention, at least on one surface, liquid crystal molecules, whose directors are not substantially coincident, exist within a predetermined interval. Therefore, for example, even when a retardation optical element having a retardation layer with a ±5% film thickness distribution, for the production reason, is disposed in between the liquid crystal cell and the polarizing plate, since the liquid crystal molecules having different directors exist within a minute interval, it is actually impossible to recognize the bright and dark pattern by human eyes. That is, the bright and dark pattern generated in the display image can be made more difficult to be recognized, for sure. And thus, the apparent display quality deterioration can be restrained.

Further, it is preferable that, also on the other surface of the two major surfaces of the retardation layer, liquid crystal molecules, whose directors are not substantially coincident, exist within a predetermined interval. Thereby, the bright and dark pattern generated in the display image can be made more difficult to be recognized, further effectively. And thus, the display quality deterioration can be restrained more effectively.

Moreover, the present invention provides a retardation layer having a fixed cholesteric structure, which functions as a negative C plate, and is characterized in that, at least on one surface of two major surfaces of the retardation layer, liquid crystal molecules, whose directors are not substantially coincident, exist within a predetermined radius region.

In the retardation layer of the present invention, at least on one surface, liquid crystal molecules, whose directors are not substantially coincident, exist within a predetermined radius region. Therefore, for example, even when a retardation optical element having a retardation layer with a ±5% film thickness distribution, for the production reason, is disposed in between the liquid crystal cell and the polarizing plate, since the liquid crystal molecules having different directors exist within a minute interval, the bright and dark pattern generated in the display image can be made more difficult to be recognized. And thus, the apparent display quality deterioration can be restrained.

Further, the present invention provides a retardation layer having a fixed cholesteric structure, which functions as a negative C plate, and is characterized in that, on a major surface of the retardation layer, those twist angles in the cholesteric structure are not substantially coincident exist at a location within a predetermined interval.

In the retardation layer of the present invention, those twist angles in the cholesteric structure are not substantially coincident exist at a location within a predetermined interval. Therefore, for example, even when a retardation optical element having a retardation layer with a ±5% filmthickness distribution, for the production reason, is disposed in between the liquid crystal cell and the polarizing plate, since those having different twist angles exist within a minute interval, it is actually impossible to recognize the bright and dark pattern by human eyes. That is, the bright and dark pattern generated in the display image can be made more difficult to be recognized, for sure. And thus, the apparent display quality deterioration can be restrained.

Moreover, the present invention provides a retardation layer having a fixed cholesteric structure, which functions as a negative C plate, and is characterized in that, on a major surface of the retardation layer, those twist angles in the cholesteric structure are not substantially coincident exist at a location within a predetermined radius region.

In the present invention, those twist angles in the cholesteric structure are not substantially coincident exist at a location within a predetermined radius region. Therefore, for example, even when a retardation optical element having a retardation layer with a ±5% film thickness distribution, for the production reason, is disposed in between the liquid crystal cell and the polarizing plate, since those having different twist angles exist within a minute region, the bright and dark pattern generated in the display image can be made more difficult to be recognized. And thus, the apparent display quality deterioration can be restrained.

Moreover, the present invention provides a retardation layer having a fixed cholesteric structure, which functions as a negative C plate, and is characterized in that the retardation layer comprises, on a cross-sectional surface comprising a normal line to a surface of the retardation layer, within a predetermined radius region, a helical axis structure region, in which an angle formed by the normal line and a helical axis of the helical axis structure region having the cholesteric structure is a clockwise acute angle from the normal line direction, and a helical axis structure region, in which the angle is a counterclockwise acute angle from the normal line direction.

In the present invention, since the retardation layer comprises, on a cross-sectional surface comprising a normal line to a surface of the retardation layer, within a predetermined radius region, a helical axis structure region, in which an angle formed by the normal line and a helical axis of the helical axis structure region having the cholesteric structure is a clockwise acute angle from the normal line direction, and a helical axis structure region, in which the angle is a counterclockwise acute angle from the normal line direction, coalescence of numbers of the adjacent helical axis structure region, to become large domains, can be inhibited. Therefore, for example, even when a retardation layer with a ±5% film thickness distribution, for the production reason, is disposed in between the liquid crystal cell and the polarizing plate, the bright and dark pattern is not generated in the display image so that the display quality deterioration can be restrained efficiently.

In the above-described invention, it is preferable that a plurality of minute units (domains) having the cholesteric structure exists. For example, if the liquid crystal molecule directors of the minute units (domains) are not substantially coincident with each other, or the twist angles in a cholesteric structure of the minute units (domains) are not substantially coincident with each other, and a plurality of such minute units (domains) exist in a state being contacted with each other, the bright and dark pattern generated in the display image can be made further difficult to be recognized, for sure. And thus, the display quality deterioration can certainly be restrained.

Further, the present invention provides a retardation layer having a cholesteric structure which is fixed in a range that its helical pitch is 1 pitch or more, which functions as a negative C plate, and is characterized in that a plurality of minute units (domains) having the cholesteric structure exist.

In the retardation layer of the present invention, a plurality of minute units (domains) having the cholesteric structure exists. Therefore, for example, even when a retardation optical element having a retardation layer with a ±5% film thickness distribution, for the production reason, is disposed in between the liquid crystal cell and the polarizing plate, since the domain is minute, the bright and dark pattern is not generated in the display image so that the display quality deterioration can be restrained efficiently.

In the above-described invention, it is preferable that a selective reflected wavelength of a selective reflected light of the cholesteric structure is shorter than the wavelength of an incident light. When the selective reflected wavelength of the selected reflected light is set shorter than the wavelength of the incident light, the minute units (domains) are considerably smaller than the case with the selective reflected wavelength of the selected reflected light is set longer than the wavelength of the incident light, so that the above-mentioned bright and dark pattern is not observed.

Moreover in the above-described invention, it is preferable that a maximum major axis of an inscribed ellipse on a surface of the minute units (domains) is 40 μm or less. Thereby, even when the above-mentioned retardation layer is disposed in between the liquid crystal cell and the polarizing plate, the bright and dark pattern is not observed in the display image so that the display quality deterioration can be restrained efficiently.

In this case, it is more preferable that the maximum major axis of the inscribed ellipse on the surface of the minute units (domains) is same as or shorter than the wavelength of the incident light. Thereby, when the above-mentioned retardation layer is disposed in between the liquid crystal cell and the polarizing plate, generation of the bright and dark pattern derived from the domain size can be prevented. The reason thereof is that the size of the domain can hardly be recognized by light because the size of the domain is same as or smaller than the wavelength of the above-mentioned incident light.

Moreover in the above-described invention, it is preferable that a alignment defect (disclination) distance between the minute units (domains) is same as or shorter than the wavelength of the incident light. Thereby, when the above-mentioned retardation layer is disposed in between the liquid crystal cell and the polarizing plate, generation of the scattering derived from the disclination can be prevented. The reason thereof is that the disclination can hardly be recognized by light because the size of the disclination is same as or smaller than the wavelength of the above-mentioned incident light.

Further in the above-described invention, it is preferable that a haze value, when the retardation layer is measured based on the JIS-K7105, is 2% or less. Thereby, even when the above-mentioned retardation layer is disposed in between the liquid crystal cell and the polarizing plate, the contrast deterioration can be restrained effectively.

Moreover in the above-described invention, it is preferable that the maximum value of the leaked light measured in a range of 380 nm to 700 nm, at the time of measuring the retardation layer interposed between the polarizing plates in the cross Nicol state, is 1% or less, with a premise that the leaked light at the time of measuring from the normal line direction with the polarizing plates in the cross Nicol state is 0% and the leaked light at the time of measuring from the normal line direction with the polarizing plates in the parallel state is 100%. Thereby, even when the above-mentioned retardation layer is disposed in between the liquid crystal cell and the polarizing plate, the contrast deterioration can be restrained effectively.

Further in the above-described invention, it is preferable that the helical axis of the minute units (domains) having the cholesteric structure and the normal line to the retardation layer surface are not substantially coincident. Among the above, it is preferable that an average value of the angle formed by the helical axis of the minute units (domains) having the cholesteric structure and the normal line to the retardation layer surface is substantially 0 degree. Thereby, even when the above-mentioned retardation layer is disposed in between the liquid crystal cell and the polarizing plate, the bright and dark pattern is not generated in the display image so that the display quality deterioration can be restrained efficiently.

Moreover in the above-described invention, the retardation layer may be a laminated retardation layer in which a second retardation layer is further laminated on the major surface of the retardation layer. Thereby, the phase difference amount, which is impossible to exhibit with a single layer, can be realized.

Further in the above-described invention, it is preferable that both of the selective reflected lights of the retardation layer and the second retardation layer have the substantially coincident selective reflected wavelength. Thereby, the optical property deterioration, when a substance transfer occurs between the two retardation layers, can be restrained.

Moreover in the above-described invention, it is preferable that the retardation layer has a molecular structure of a three dimensionally cross-linked chiral nematic liquid crystal, or a molecular state of a polymer cholesteric liquid crystal in a glass state. Thereby, the molecular structure of the cholesteric regularity can be stably maintained.

Further, present invention provides a retardation optical element comprising a transparent base material, and the above-described retardation layer formed on the transparent base material surface.

In this case, it is preferable that an alignment layer is formed in between the transparent base material and the retardation layer. Thereby, the molecular structure of the cholesteric regularity can stably be maintained mechanically.

Further, it is preferable that a color filter layer is formed in between the transparent base material and the retardation layer. Thereby, the transmittance can be made higher by preventing the surface reflection of the transparent base material, the color filter layer, and between the retardation layers.

Further, the present invention provides a polarizing element characterized in that, in the transparent base material of the above-described retardation optical element, a polarizing layer is disposed on a surface on which the retardation layer is not formed. In the present invention, since the polarizing layer is provided on at least one side of the retardation optical element, the reflection at the surface of the retardation optical element will be extremely small so that the generation of the bright and dark pattern can be effectively restrained. Also, the contrast can be improved, and the display quality deterioration can be restrained effectively.

Further, the present invention provides a liquid crystal display apparatus comprising: a liquid crystal cell; a pair of polarizing plates disposed so as to interpose the liquid crystal cell; and the above-described retardation optical element disposed in between the liquid crystal cell and at least one of the pair of the polarizing plates. Thereby, the generation of the bright and dark pattern in the liquid crystal display apparatus can be restrained, and the contrast can be improved, so that the display quality deterioration can be restrained.

Moreover, the present invention provides a method for manufacturing a retardation optical element comprising: an alignment layer forming step of forming an alignment layer on a transparent base material; a coating step of coating a retardation layer forming coating solution, including a liquid crystal material having the cholesteric regularity for forming a cholesteric liquid crystal structure, on the alignment layer, in a state that a rubbing treatment is not subjected to the alignment layer; an alignment treatment step of subjecting an alignment treatment to the retardation layer formed on the alignment layer in the coating step; and a fixing step of fixing the cholesteric liquid crystal structure exhibited in a liquid crystal phase state in the retardation layer, by subjecting a solidifying treatment to the retardation layer aligned by the alignment treatment, so as to be fixed.

In the present invention, since the retardation layer is formed on the alignment layer not subjected to the rubbing treatment, a retardation layer of a small minute unit (domain) can be provided. Therefore, a retardation optical element having a good display quality, when used for a liquid crystal display apparatus or the like, can be manufactured.

BEST MODE FOR CARRYING OUT THE INVENTION

The present invention includes a retardation layer, a retardation optical element using the same, and furthermore, a liquid crystal display apparatus. Hereinafter, each will be described in detail.

A. Retardation Layer

First, the retardation layer of the present invention will be explained. The retardation layer of the present invention can be classified into six embodiments. Hereinafter, each embodiment will be explained.

1. First Embodiment

The first embodiment of the retardation layer of the present invention is a retardation layer having a cholesteric structure which is fixed in a range that its helical pitch is 1 pitch or more, functions as a negative C plate, and is characterized in that a plurality of minute units (domains) having the cholesteric structure exist. Moreover, it is more preferable that a selective reflected wavelength of a selective reflected light of the cholesteric structure is shorter than the wavelength of a major incident light.

In this embodiment, since the above-mentioned minute units (domains) having the cholesteric structure exist in a plurality in the above-mentioned retardation layer. Therefore, for example, even when a retardation layer with a ±5% film thickness distribution, for the production reason, is disposed in between the liquid crystal cell and the polarizing plate, since the domain is minute, the bright and dark pattern is not generated in the display image so that the display quality deterioration can be restrained efficiently. The reason thereof is that when the selective reflected wavelength of the selected reflected light is set shorter than the wavelength of the incident light, the minute units (domains) are considerably smaller than the case when the selective reflected wavelength of the selected reflected light is set longer than the wavelength of the incident light. Thus, the uneven pattern, observed in FIG. 2 of above-mentioned SID '94 Digest, 915 (1994) by Y. Iimura et al., for example, is not observed so as not to generate the bright and dark pattern.

For the reason why the above-mentioned phenomenon is brought about, apparent evidence has not been found so far. However, we presume as follows. That is, when the selective reflected wavelength of the cholesteric structure is set on the long wavelength side, the size of the minute units (domains) formed on the alignment layer not subjected to the rubbing treatment is relatively large. Thus, they are visible size so that opaqueness is generated due to the scattering phenomenon. On the other hand, when the selective reflected wavelength of the cholesteric structure is set on the short wavelength side, the size of the minute units (domains) formed on the alignment layer not subjected to the rubbing treatment is relatively small. Thus, they are not visible size so that the scattering phenomenon is not caused.

Hereinafter, the retardation layer of this embodiment will be explained in detail with reference to the drawings.

Figure 1:
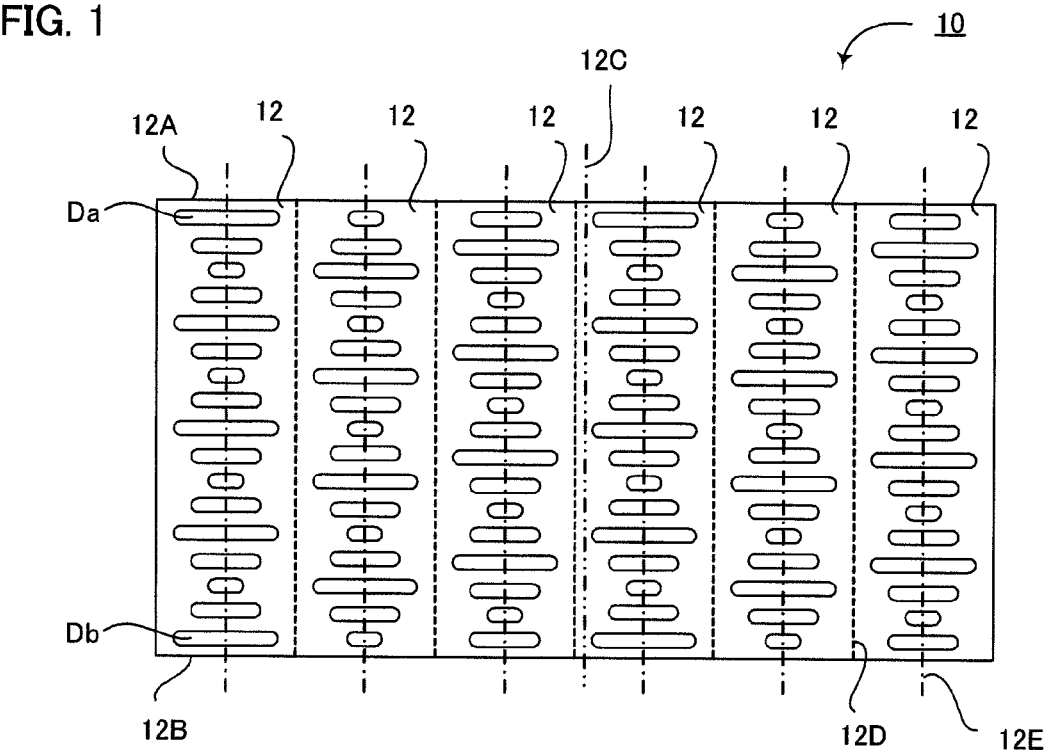
FIG. 1 is an enlarged schematic cross-sectional view of a part of a retardation layer as an example of the present invention.

FIG. 1 is a schematic view showing a cross-sectional surface of an example of a retardation layer of this embodiment. As shown in FIG. 1, the retardation layer 10 of this embodiment comprises a large number of minute units (domains) 12 having the molecular structure of the cholesteric regularity (helical structure).

Here, the minute units (domains), having the molecular structure of the cholesteric regularity, has an optical rotation selective property (polarized light separating property) of separating an optical rotation component (circularly polarized light component) of one direction from an optical rotation component of the opposite direction, based on the physical molecular arrangement (planer arrangement) of the liquid crystal molecules. Such phenomenon is known as the circular dichroism. By optionally selecting the optical rotation direction in the helical structure of the liquid crystal molecules, the circularly polarized light component having the same optical rotation direction as this optical rotation direction is selectively reflected.

The maximum optical rotation polarized light scattering (peak of the selective reflection) in this case is generated at the wavelength $\lambda_0$ of the following formula (1)

$$\lambda_0 = nav \cdot p \tag{1}$$

Here, p is the helical pitch in the helical structure of the liquid crystal molecules, and nav is the average refractive index in the plane orthogonal to the helical axis.

On the other hand, the wavelength band width $\Delta\lambda$ of the selective reflected light in this case is represented by the following formula (2).

$$\Delta\lambda = \Delta n \cdot p \tag{2}$$

Here, $\Delta n$ is a birefringence value represented as the difference between the refractive index with respect to an ordinary light and the refractive index with respect to an extraordinary light.

That is, in the minute units (domains) having such a molecular structure of the cholesteric regularity, according to the above-mentioned polarized light separating property, one of the clockwise or counterclockwise circular polarized light components, in a range of the wavelength band width $\Delta\lambda$ centering the selective reflected wavelength $\lambda_0$, among an incident non-polarized light is reflected, and light of the other circular polarized light components and light (non-polarized light) of the wavelength region other than the selective reflected wavelength are transmitted. Unlike the ordinary reflection, the reflected clockwise or counterclockwise circularly polarized light component is reflected without inversion of the rotation direction.

Moreover, in this embodiment, the helical pitch of the molecular structure in the minute units (domains) is adjusted such that the selective reflected wavelength of the selected reflected light deriving from the molecular structure is shorter than the wavelength of the incident light incident on the minute units (domains).

In this embodiment, it is preferable that the selective reflected wavelength of the above-mentioned selected reflected light is shorter than the wavelength of the incident light. Moreover, since the incident light is usually a visible light, the above-mentioned selective reflected wavelength is preferably shorter than the wavelength of a visible light. Specifically, it is preferably 380 nm or less, and it is particularly preferably 280 nm or less. As to the lower limit, although it is not particularly limited, it is generally 150 nm or more.

There are following three reasons for adjusting the selective reflected wavelength of the selective reflected light so as to be smaller than the incident light, in particular, the wavelength of a visible light.

For the first reason, in order to prevent reflection of the incident light by the selective reflection due to the molecular structure of the cholesteric regularity, it is necessary that the selective reflected wavelength is smaller than or larger than the wavelength of the incident light. Therefore, in the case the incident light on the minute units (domains) is a visible light (wavelength band width: 380 nm to 780 nm), it is preferable that it is out of the band width of the above-mentioned range, and the selective reflected wavelength is preferably smaller than 380 nm or larger than 780 nm.

For the second reason, in order to exhibit the function as a negative C plate (function as a retardation layer) by the minute units (domains) so as not to exhibit the optical rotation function like a TN liquid crystal, it is preferable that the selective reflected wavelength is smaller than the wavelength of the incident light. In the case the incident light on the minute units (domains) is a visible light, as mentioned above, the selective reflected wavelength is preferably 380 nm or less.

The third reason is that when the selective reflected wavelength is set shorter than the wavelength of the incident light, the minute units (domains) become considerably smaller than the case when the selective reflected wavelength of the selective reflected light is set longer than the wavelength of the incident light, so that the bright and dark pattern is not be observed. For the reason why the above-mentioned phenomenon is brought about, apparent evidence has not been found so far. However, we presume as follows.

That is, when the case the selective reflected wavelength of the cholesteric structure is set on the long wavelength side, the size of the minute units (domains) formed on the alignment layer not subjected to the rubbing treatment is relatively large so as to be visible. Thus, opaqueness is generated due to the scattering phenomenon. On the other hand, when the selective reflected wavelength of the cholesteric structure is set on the short wavelength side, the size of the minute units (domains) formed on the alignment layer not subjected to the rubbing treatment is relatively small so as not to be visible. Thus, the scattering phenomenon is not caused.

Moreover, in this embodiment, as shown in FIG. 1, since a plurality of the minute units (domains) 12 existing in the retardation layer 10 do not employ the optical rotation function like a TN liquid crystal, the film thickness of each is adjusted such that the helical pitch is 1 pitch or more, or preferably 5 pitches or more. The specific number of the pitches can be calculated from the desired film thickness (see K. Kashima et al., IDW '02, 413 (2002)).

In this embodiment, the twist angles in the cholesteric structure, of a plurality of the minute units (domains) existing in the retardation layer, may be substantially not coincident with each other.

Figure 2:
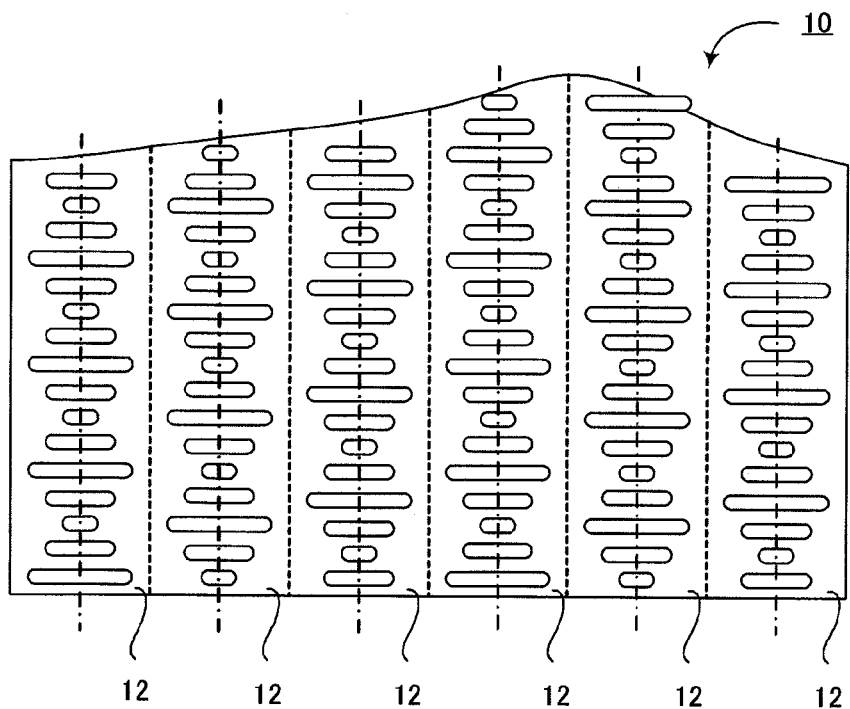
FIG. 2 is an enlarged schematic cross-sectional view of a part of a retardation layer as another example of the present invention.

For example, as shown in FIG. 2, when the retardation layer 10 has a film thickness distribution, the twist angles of the minute units (domains) 12 are not coincident with each other. Such a state will be a critical defect in the case of a TN mode liquid crystal utilizing the optical rotation function. However, the present invention is intended to shift the phase of the polarized light, not utilizing the optical rotation function. Therefore, there will not be a serious problem, only a slight displacement of the phase shift amount.

Moreover, as shown in FIG. 1, the retardation layer 10 comprises two major surfaces (wider surfaces) 12A and 12B, disposed orthogonal to the thickness direction and facing with each other. In this embodiment, it is preferable that, on one surface 12A of the two major surfaces 12A and 12B of the retardation layer 10, the directions of the liquid crystal molecule directors Da, of a plurality of the minute units (domains) 12, are not substantially coincident. Furthermore, it is preferable that the directions of the liquid crystal molecule directors Db, of a plurality of the minute units (domains) 12 on the other surface 12B, are not substantially coincident. Moreover, in this embodiment, it is preferable that the liquid crystal molecule directors on each minute unit (domains) 12 surface are substantially at random.

In the case the above-mentioned retardation layer has a film thickness distribution, if a mono-domain is to be produced by making the directors of the all liquid crystal molecules on the retardation layer surface coincident, there arises a problem that a plurality of large island-like domains (the maximum major axis of the inscribing ellipse on the domain surface is 5 to 100 mm), which has failed to be a mono-domain, is visibly recognized as a bright and dark pattern. On the other hand, in the present invention, a plurality of minute units (domains) exists in the retardation layer and the liquid crystal molecule directors on the surface of these pluralitys of the minute units (domains) are not coincident. Therefore, even when the retardation layer has the film thickness distribution, the bright and dark pattern is not generated, and it is advantageous in that the display quality deterioration can be restrained.

In the case a mono-domain is to be produced, an alignment layer subjected to the rubbing treatment may be used. In the case a plurality of minute units (domains) is to be produced, an alignment layer not subjected to the rubbing treatment may be used. Since these are disclosed in JP-A No. 7-175065, R. Holding et al., SID '93 Digest, 622 (1993), and Y. Iimura et al., SID '94 Digest, 915 (1994), explanation is omitted here. In one word, the above derives from the fact that an alignment layer not subjected to the rubbing treatment has an alignment limiting force in the horizontal direction with respect to the liquid crystal molecules, and the force direction is at random in the plane.

Figure 3:
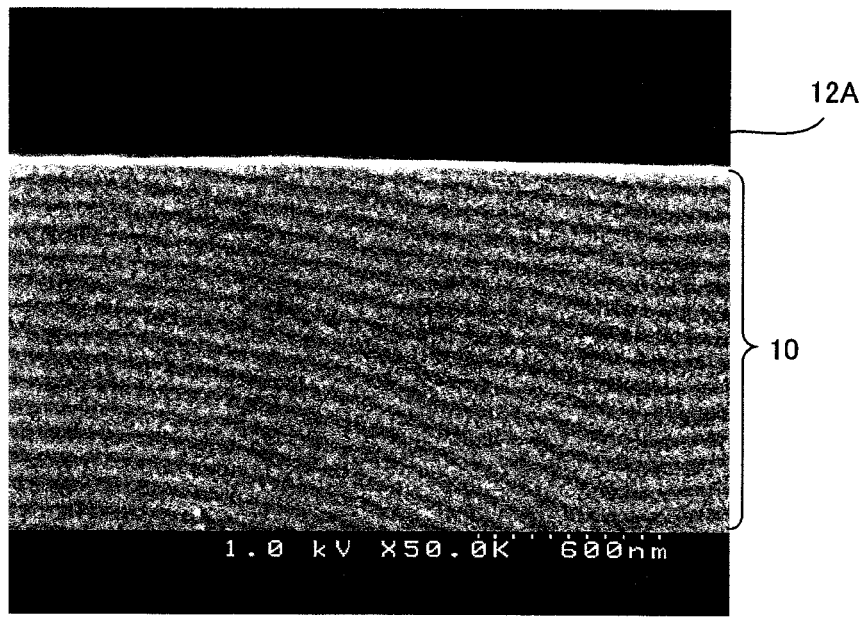
FIG. 3 is a transmission type electron microscope photograph showing an example of the cross-sectional surface of a retardation layer of the present invention.

Here, whether or not, the direction of the liquid crystal molecule director in the surface of the minute units (domains) are substantially coincident, can be judged by the observation of the cross-sectional surface of the retardation layer with a transmission type electron microscope. Specifically, for example as shown in FIG. 3, by observing the cross-sectional surface of the retardation layer 10, which is solidified with the molecular structure of the cholesteric regularity, with a transmission type electron microscope, a bright and dark pattern corresponding to the molecular helical pitch peculiar to the molecular structure of the cholesteric regularity is observed. Therefore, when there is unevenness in the density of brightness and darkness, along the plane, on each surface (surface 12A, for example), it can be judged that the liquid crystal molecule directors are not substantially coincident in this plane.

The term "liquid crystal molecule" is generally used for the meaning as a molecule having both the flowability of a liquid and the anisotropy of a crystal. However, in this specification, for the convenience, the term "liquid crystal molecule" is used also for a molecule solidified while maintaining the anisotropy provided in a state of the molecule having the flowability. The examples of the methods, for solidification while maintaining the anisotropy provided in a state of the molecule having the flowability, are as follows: a method in which liquid crystalline molecules having a polymerizable group (polymerizable monomer molecules or polymerizable oligomer molecules) are cross-linked; and a method in which polymer liquid crystals (liquid crystal polymers) are cooled to a temperature of its glass transition temperature or lower, or the like.

Moreover, the retardation layer, of this embodiment having the molecular structure of the cholesteric regularity, has the anisotropy, that is, the birefringence. Therefore, the refractive index in the thickness direction and the refractive index in the plane direction differ, so that the layer functions as a negative C plate.

Here, the retardation layer is classified by the orientation of the optical axis and the size of the refractive index in the optical axis direction with respect to the refractive index in the direction perpendicular to the optical axis. Those having the optical axis direction along the plane of the retardation layer are referred to as an A plate. Those having the optical axis direction oriented in the normal line direction to, which is perpendicular to, the retardation layer are referred to as a C plate. And those having the optical axis direction inclined with respect to the normal line direction are referred to as an O plate. Moreover, those having the refractive index in the optical axis direction larger than the refractive index in the direction orthogonal to the optical axis are called a positive plate, and those having the refractive index in the optical axis direction smaller than the refractive index orthogonal to the optical axis a negative plate. Therefore, there are classifications of the positive A plate, the negative A plate, the positive C plate, the negative C plate, the positive O plate and the negative O plate. In this embodiment, the retardation layer functions as a negative C plate. The negative C plate has the optical axis direction oriented in the normal line direction to, which is perpendicular to, the retardation layer. And the refractive index in the optical axis direction is smaller than the refractive index in the direction orthogonal to the optical axis.

That is, in the three dimensional orthogonal coordinate system, with the premise that the refractive indices of the retardation layer in the plane direction are Nx, Ny and the refractive index in the thickness direction is Nz, the relationship of Nz<Nx=Ny is satisfied. Therefore, for example as shown in FIG. 1, when a linearly polarized light is incident on the retardation layer 10, the incident linearly polarized light in the normal line 12C direction of the retardation layer 10 is transmitted without its phase being shifted. However, for the incident linearly polarized light in a direction inclined with respect to the normal line 12C of the retardation layer 12, the phase difference is generated at the time of transmitting through the retardation layer 10, so as to be an elliptically polarized light. On the other hand, when an elliptically polarized light is incident in a direction inclined with respect to the normal line 12C of the retardation layer 10, the incident elliptically polarized light can be made into a linearly polarized light.

In each minute unit (domain) 12 of the retardation layer 10, the direction of the directors Da and Db of the liquid crystal molecules, in the entire range of the major surfaces 12A and 12B, are substantially coincident.

Here, in FIG. 1, the reference numeral 12D denotes the boundary between each minute units (domain) 12, and in FIG. 1, the reference numeral 12E denotes the helical axis of each minute unit (domain) 12.

In this embodiment, the size of the minute unit (domain) surface is preferably a degree that cannot be judged visibly. Specifically, it is preferable that the maximum major axis of the inscribed ellipse is 40 µm or less, preferably 20 µm or less, more preferably 10 µm or less, and particularly preferably 5 µm or less. Since the size of the minute unit (domain) surface is in the above-mentioned range, the minute units (domains) cannot be judged visibly so that the bright and dark pattern cannot be recognized visibly. Thus, defects deriving from the bright and dark pattern can be restrained substantially.

Furthermore, it is preferable that the size of the above-mentioned minute unit (domain) surface is same as or less than the incident wavelength. Particularly, it is preferably same as or less than the visible light wavelength, that is, 380 nm or less. Also in this case, since the size of the minute unit (domain) surface is in the above-mentioned range, the generation of the bright and dark pattern can be restrained practically.

Accordingly, when the size of the minute unit (domain) surface is made smaller, it is preferable that the selective reflected wavelength is made shorter, as mentioned above. Specifically, the selective reflected wavelength maybe 380 nm or less, preferably 280 nm or less.

For the size of the minute unit (domain) surface in this embodiment, the actual measurement value by a polarization microscope may be used. In the case the size of the minute unit (domain) surface cannot be recognized with a polarization microscope, an analysis technique utilizing the electron or the like, instead of the light, such as a AFM, a SEM and a TEM can be used.

Moreover, in this embodiment, it is preferable that each helical axis of a plurality of the minute units (domains) and the normal line to the retardation layer surface are not substantially coincident. For example, as shown in FIG. 1, in the case the helical axis 12E of the plurality of the minute units (domains) 12 and the normal line 12C to the retardation layer surface are not substantially coincident, the plurality of the minute units can further be made smaller. The reason thereof is that coalescence of a plurality of adjacent minute units (domains) into a larger domain can be prevented.

Accordingly, in order to have the helical axis of a plurality of the minute units (domains)) and the normal line to the retardation layer surface not substantially coincident, a method of directing wind to the retardation layer surface when the retardation layer is manufactured, or the like may be used.

Furthermore, it is preferable that the average value of the angle formed by each helical axis of the above-mentioned plurality of the minute units (domains) having the cholesteric structure and the normal line to the above-mentioned retardation layer surface is substantially 0 degree. Since the average value of the angle formed by each helical axis of the above-mentioned plurality of the minute units (domains) having the cholesteric structure and the normal line to the above-mentioned retardation layer surface is substantially 0 degree, even when the above-mentioned retardation layer is disposed in between the liquid crystal cell and the polarizing plate, the bright and dark pattern is not generated in the display image, so that the display quality deterioration can be restrained further effectively.

Moreover, in this embodiment, it is preferable that the alignment defect (disclination) distance between the minute units (domains) is same as or less than the incident light wavelength. Specifically, it is preferably same as or less than the wavelength of a visible light, that is, 380 nm or less, in particular, 280 nm or less. Since the alignment defect (disclination) distance between the minute units (domains) is in the above-mentioned range, scattering due to the disclination will not be generated.

Accordingly, in the case the alignment defect (disclination) distance between the minute units (domains) is to be made smaller, the selective reflected wavelength may be made shorter, as mentioned above. Specifically, the selective reflected wavelength may be 380 nm or less, and preferably 280 nm or less.

Moreover, the haze value at the time of measuring the above-mentioned retardation layer based on the JIS-K7105 is preferably 10% or less, more preferably 2% or less, and particularly 1% or less. Since the above-mentioned haze value is in the above-mentioned range, scattering due to the disclination between the minute units (domains) will not be generated. Thus, the contrast deterioration can effectively be restrained even when the above-mentioned retardation layer is disposed in between the liquid crystal cell and the polarizing plate.

By restraining the scattering due to the disclination between the above-mentioned minute units (domains), the haze value at the time of measuring based on the JIS-K7105 can be restrained to 10% or less, more preferably 2% or less, furthermore 1% or less. For doing so, the selective reflected wavelength may be made shorter, as mentioned above. Specifically, the selective reflected wavelength may be 380 nm or less, and preferably 280 nm or less.

In this embodiment, with a premise that the leaked light at the time of measuring from the normal line direction with the polarizing plates in the cross Nicol state is 0% and the leaked light at the time of measuring from the normal line direction with the polarizing plates in the parallel state is 100%, it is preferable that the maximum value of the leaked light measured in the range of 380 nm to 700 nm at the time of measuring the above-mentioned retardation layer interposed between the polarizing plates in the cross Nicol state is 1% or less, and it is particularly preferably 0.1% or less. Since the maximum value of the above-mentioned leaked light is in the above-mentioned range, even when the above-mentioned retardation layer is disposed in between the liquid crystal cell and the polarizing plate, the contrast deterioration can effectively be restrained.

By making the above-mentioned haze value smaller, the above-mentioned maximum value of the leaked light can be restrained to 1% or less, furthermore, to 0.1% or less. For doing so, the selective reflected wavelength may be made shorter, as mentioned above. Specifically, the selective reflected wavelength may be 380 nm or less, and preferably 280 nm or less.

Moreover, as the material used for the above-mentioned retardation layer, a liquid crystal material exhibiting the cholesteric liquid crystal phase can be used. The liquid crystal material is not particularly limited as long as it has the cholesteric regularity, and a polymerizable liquid crystal material (polymerizable monomer or polymerizable oligomer) or a liquid crystal polymer can be used.

In this embodiment, among the above-mentioned materials, it is preferable to use a three dimensionally cross linkable polymerizable monomer or polymerizable oligomer because the liquid crystal molecules can be fixed optically in the cholesteric liquid crystal state. Thus, a film easy to be handled as an optical film, which is stable at the room temperature, can be provided. The "three dimensional cross linking" denotes polymerization of the polymerizable monomer molecules or the polymerizable oligomer molecules three dimensionally with each other, so as to provide a mesh (network) structure.

Moreover, a liquid crystal polymer (polymer cholesteric liquid crystal), which can be solidified into a glass state by cooling, can also be used. Also in this case, the liquid crystal molecules can be fixed optically in the cholesteric liquid crystal state. Thus, a film easy to be handled as an optical film, which is stable at the room temperature, can be provided.

As the above-mentioned three dimensionally cross linkable polymerizable monomer, a mixture of a liquid crystalline monomer and a chiral compound as disclosed in JP-A Nos. 7-258638, 11-513019 or 9-506088, 10-508882 can be used. For example, by adding a chiral agent to a liquid crystalline monomer exhibiting the nematic liquid crystal phase, a chiral nematic liquid crystal (cholesteric liquid crystal) can be obtained. The method for manufacturing a cholesteric thin film is disclosed also in JP-A Nos. 2001-5684 and 2001-10045. As such a liquid crystalline monomer, for example, the compounds represented by the general formulae (1) to (11) can be used. Here, in the case of a liquid crystalline monomer represented by the general formula (11), X is preferably 2 to 5 (integer).

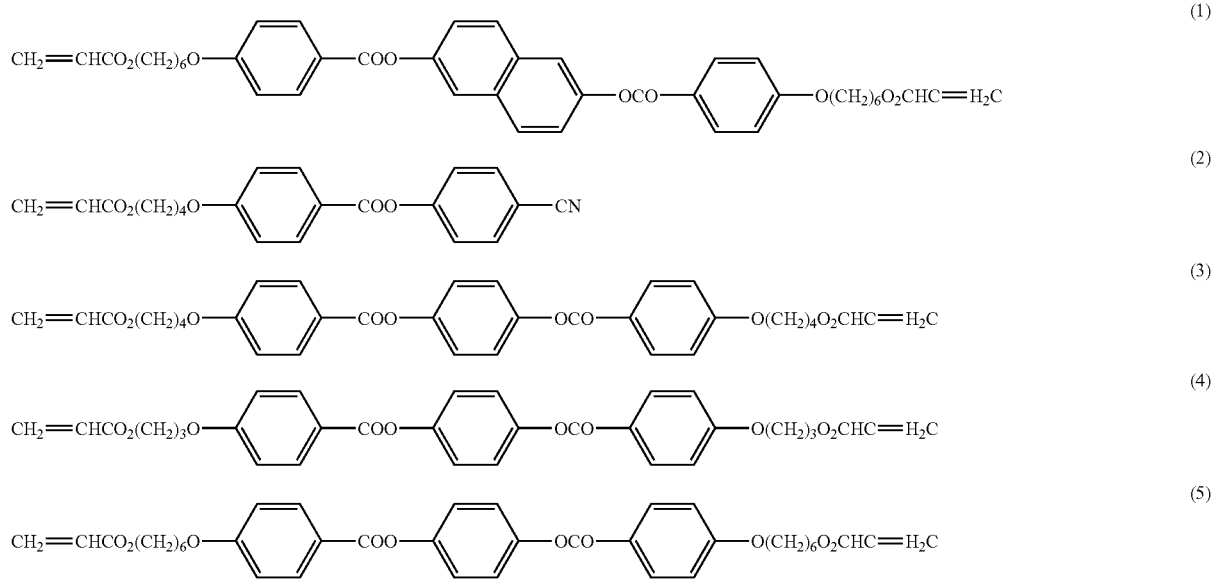

-continued

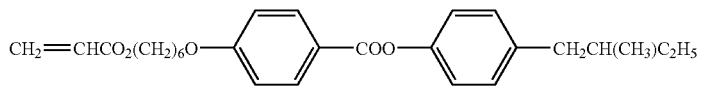
(6)

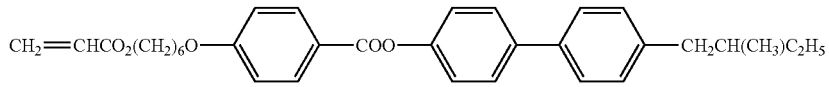
(7)

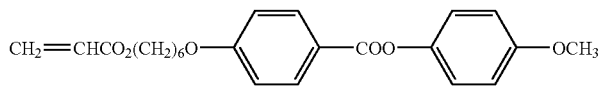
(8)

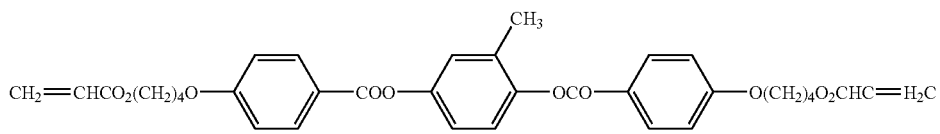
(9)

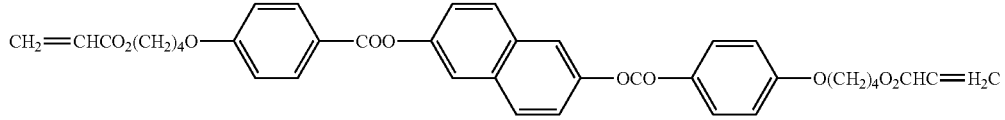
(10)

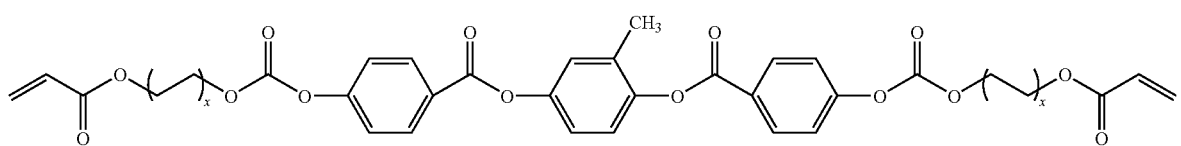
11

X is an integer of 2 to 5

Moreover, as the above-mentioned chiral agent, for example, it is preferable to use a compound represented by the general formulae (12) to (14). In the case of a chiral agent represented by the general formulae (12) and (13), X is preferably 2 to 12 (integer). Moreover, in the case of a chiral agent represented by the general formula (14), X is preferably 2 to 5 (integer). Here, in the general formula (12), $R^4$ denotes a hydrogen or a methyl group.

Moreover, as the above-mentioned three dimensionally cross linkable polymerizable oligomer, a cyclic organo polysiloxane compound having a cholesteric phase as disclosed in JP-A No. 57-165480, or the like can be used.

Furthermore, as the above-mentioned liquid crystal polymer: a polymer, in which a mesogen group exhibiting liquid crystal is introduced at the positions of the principal chain, the side chain, or both of the principal chain and the side chain; a

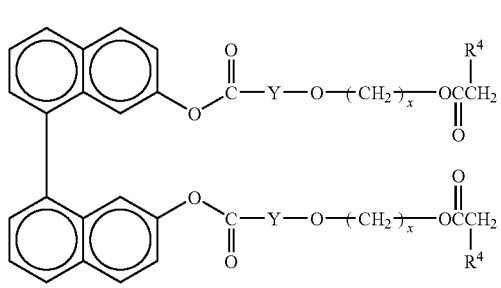
(12)

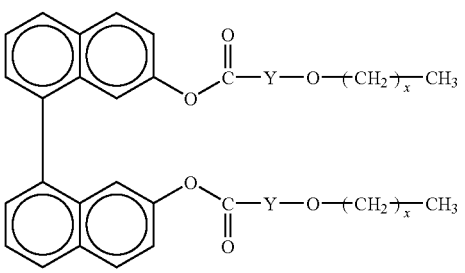
(13)

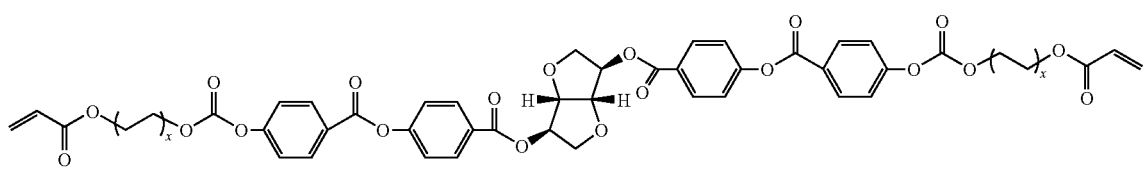
(14)

polymer cholesteric liquid crystal having a choresteryl group introduced to the side chain; a liquid crystalline polymer as disclosed in JP-A No. 9-133810; a liquid crystalline polymer as disclosed in JP-A No. 11-293252; or the like can be used.

The retardation layer of this embodiment is not limited to one comprising one layer, but it may be a laminated retardation layer formed by laminating a second retardation layer, or further, a plurality of retardation layers as needed, on the major surface of the retardation layer.

By providing the retardation layer as a laminated member of a plurality of the retardation layers, various optical compensations can also be realized by using the retardation layers having different birefringence values, helical pitches, or the like.

In such a laminated retardation layer having a multiple layer structure, in the two major surfaces facing with each other, located on the outermost surfaces of each retardation layer, even though the directors of the liquid crystal molecules in each minute unit (domain) are substantially coincident, the director of each minute unit (domain) is not substantially coincident with each other.

Moreover, it is preferable that the selective reflected lights of the above-mentioned retardation layer and the above-mentioned second retardation layer have the substantially same selective reflected wavelength. Furthermore, it is preferable that the liquid crystalline materials used for forming each retardation layer have the substantially same components. Thereby, the substance transfer between the above-mentioned retardation layer and the above-mentioned second retardation layer can be prevented substantially so that a laminated retardation layer can be manufactured as a lamination of further uniform retardation layer.

2. Second Embodiment

The second embodiment of the retardation layer of the present invention is a retardation layer having a fixed cholesteric structure, functions as a negative C plate, and is characterized in that, at least on one surface of two major surfaces of the retardation layer, liquid crystal molecules, whose directors are not substantially coincident, exist within an interval of 100 µm, preferably within an interval of 10 µm.

Moreover, it is preferable that also on the other surface of two major surfaces of the retardation layer, liquid crystal molecules, whose directors are not substantially coincident, exist within a predetermined interval.

At the time, in the retardation layer, it is preferable that: a plurality of minute units (domains) having the cholesteric structure exists; within the minute unit (domain), the directors of the liquid crystal molecules are substantially coincident; and such minute units (domains) are in a state adjacent with each other.

Furthermore, it is more preferable that the selective reflected wavelength of the selective reflected light of the above-mentioned cholesteric structure is shorter than the wavelength of the incident light.

In this embodiment, on major surface of the retardation layer, liquid crystal molecules, whose directors are not substantially coincident, exist within a predetermined interval. Therefore, for example, even when a retardation layer with a ±5% film thickness distribution, for the production reason, is disposed in between the liquid crystal cell and the polarizing plate, since the liquid crystal molecules having different directors exist within a minute interval, the bright and dark pattern is not generated in the display image. And thus, the display quality deterioration can be restrained effectively. The reason thereof is that, since the liquid crystal molecules having different directors exist in a minute interval, the human eyes cannot recognize the bright and dark pattern. Also, by setting the selective reflected wavelength of the selective reflected light of the above-mentioned cholesteric structure shorter than the wavelength of the incident light, the minute units (domains) are considerably smaller than the case when the selective reflected wavelength of the selected reflected light is set longer than the wavelength of the incident light. Thus, the uneven pattern observed in, for example, FIG. 2 of the above-described Y. Iimura et al., SID '94 Digest, 915 (1994) is not observed so as not to generate the bright and dark pattern.

The existence of ones whose directors of the liquid crystal molecules not substantially coincident can be confirmed by the observation of the cross-sectional surface of the retardation layer with a transmission type electron microscope as in the above-mentioned first embodiment.

Moreover, in this embodiment, "the directors of the liquid crystal molecules are not substantially coincident" denotes that the directors of the liquid crystal molecules are different in the range of 10 degrees to 170 degrees.

Since the other points of the retardation layer are same as those mentioned in the above-mentioned first embodiment, explanation is not repeated here.

3. Third Embodiment

The third embodiment of the retardation layer of the present invention is a retardation layer having a fixed cholesteric structure, which functions as a negative C plate, and is characterized in that, at least on one surface of two major surfaces of the retardation layer, liquid crystal molecules, whose directors are not substantially coincident, exist within a 50 µm radius region, preferably within a 5 µm radius region.

Moreover, it is preferable that also on the other surface of two major surfaces of the retardation layer, liquid crystal molecules, whose directors are not substantially coincident, exist within a predetermined radius region.

At the time, in the retardation layer, it is preferable that: a plurality of minute units (domains) having the cholesteric structure exists; within the minute unit (domain), the directors of the liquid crystal molecules are substantially coincident; and such minute units (domains) are in a state adjacent with each other.

Furthermore, it is more preferable that the selective reflected wavelength of the selective reflected light of the above-mentioned cholesteric structure is shorter than the wavelength of the incident light.

In this embodiment, on major surface of the retardation layer, liquid crystal molecules, whose directors are not substantially coincident, exist within a predetermined radius region. Therefore, for example, even when a retardation layer with a ±5% film thickness distribution, for the production reason, is disposed in between the liquid crystal cell and the polarizing plate, since the liquid crystal molecules having different directors exist within a minute radius region, the bright and dark pattern is not generated in the display image. And thus, the display quality deterioration can be restrained effectively. The reason thereof is that, since the liquid crystal molecules having different directors exist in a minute radius region, the human eyes cannot recognize the bright and dark pattern. Also, by setting the selective reflected wavelength of the selective reflected light of the above-mentioned cholesteric structure shorter than the wavelength of the incident light, the minute units (domains) are considerably smaller than the case when the selective reflected wavelength of the selected reflected light is set longer than the wavelength of the incident light. Thus, the uneven pattern observed in, for example, FIG. 2 of the above-described Y. Iimura et al., SID '94 Digest, 915 (1994) is not observed so as not to generate the bright and dark pattern.

The existence of ones whose directors of the liquid crystal molecules not substantially coincident can be confirmed by the observation of the cross-sectional surface of the retardation layer with a transmission type electron microscope as in the above-mentioned first embodiment.

Moreover, "the directors of the liquid crystal molecules are not substantially coincident" denotes the same as described in the column of the above-described second embodiment.

In this embodiment, it is preferable that the directors of the liquid crystal molecules, that are not substantially coincident, exist within a predetermined radius region by 10% or more, more preferably 50% or more. Since the directors of the liquid crystal molecules, that are not substantially coincident, exist in the above-mentioned range, the bright and dark pattern generated in the display image can be made more difficult to be recognizable, for sure.

Since the other points of the retardation layer are same as those mentioned in the above-mentioned first embodiment, explanation is not repeated here.

4. Fourth Embodiment

The fourth embodiment of the retardation layer of the present invention is a retardation layer having a fixed cholesteric structure, which functions as a negative C plate, and is characterized in that, on a major surface of the retardation layer, those twist angles in the cholesteric structure are not substantially coincident exist at a location within an interval of 100 µm, preferably within an interval of 10 µm.

At the time, in the retardation layer, it is preferable that: a plurality of minute units (domains) having the cholesteric structure exists; within the minute unit (domain), twist angles in the cholesteric structure are substantially coincident; and such minute units (domains) are in a state adjacent with each other.

Furthermore, it is more preferable that the selective reflected wavelength of the selective reflected light of the above-mentioned cholesteric structure is shorter than the wavelength of the incident light.

In this embodiment, on major surface of the retardation layer, those twist angles in the cholesteric structure are not substantially coincident exist at a location within a predetermined interval. Therefore, for example, even when a retardation layer with a ±5% film thickness distribution, for the production reason, is disposed in between the liquid crystal cell and the polarizing plate, since those twist angles are different exist within a minute interval, the bright and dark pattern is not generated in the display image. And thus, the display quality deterioration can be restrained effectively. The reason thereof is that, since those twist angles are different exist within a minute interval, the human eyes cannot recognize the bright and dark pattern. Also, by setting the selective reflected wavelength of the selective reflected light of the above-mentioned cholesteric structure shorter than the wavelength of the incident light, the minute units (domains) are considerably smaller than the case when the selective reflected wavelength of the selected reflected light is set longer than the wavelength of the incident light. Thus, the uneven pattern observed in, for example, FIG. 2 of the above-described Y. Iimura et al., SID '94 Digest, 915 (1994) is not observed so as not to generate the bright and dark pattern.

Figure 4:
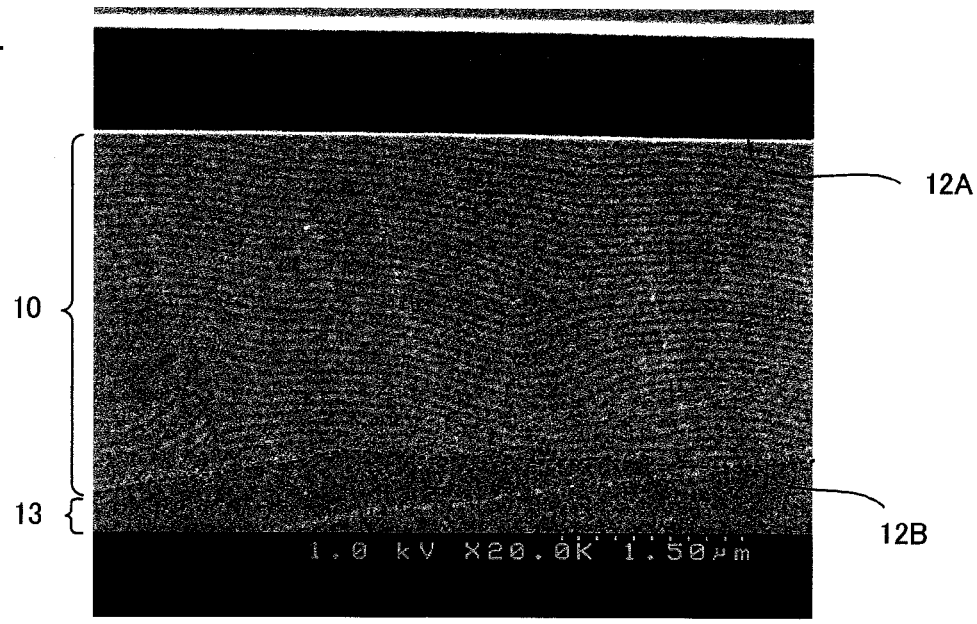
FIG. 4 is a transmission type electron microscope photograph showing another example of the cross-sectional surface of a retardation layer of the present invention.

The existence of those twist angles in the cholesteric structure are not substantially coincident can be confirmed by the observation of the cross-sectional surface of the retardation layer with a transmission type electron microscope. Specifically, for example as shown in FIG. 4, by observing the cross-sectional surface of the retardation layer 10 fixed with the molecular structure of the cholesteric regularity with a transmission type electron microscope, the bright and dark pattern corresponding to the pitch of the molecular helix, peculiar to the molecular structure of the cholesteric regularity can be observed. Therefore, if those having different pitches exist, it can be judged that those twist angles in the cholesteric structure are not substantially coincident exist. In FIG. 4, 12A and 12B are the major surfaces of the retardation layer 10, and the retardation layer 10 has a film thickness distribution. Moreover, the reference numeral 13 is a TAC film and an alignment layer, and the TAC film, the alignment layer, and the retardation layer are laminated in this order.

Moreover, in this embodiment, "the twist angles in the cholesteric structure are not substantially coincident" denotes that the twist angles are different by 10 degrees or more. In particular, it is preferable that they are different by 90 degrees or more.

Since the other points of the retardation layer are same as those mentioned in the above-mentioned first embodiment, explanation is not repeated here.

5. Fifth Embodiment

The fifth embodiment of the retardation layer of the present invention is a retardation layer having a fixed cholesteric structure, which functions as a negative C plate, and is characterized in that, on a major surface of the retardation layer, those twist angles in the cholesteric structure are not substantially coincident exist at a location within a 50 µm radius region, preferably within a 5 µm radius region.

At the time, in the retardation layer, it is preferable that: a plurality of minute units (domains) having the cholesteric structure exists; within the minute unit (domain), twist angles in the cholesteric structure are substantially coincident; and such minute units (domains) are in a state adjacent with each other.

Furthermore, it is more preferable that the selective reflected wavelength of the selective reflected light of the above-mentioned cholesteric structure is shorter than the wavelength of the incident light.

In this embodiment, on major surface of the retardation layer, those twist angles in the cholesteric structure are not substantially coincident exist at a location within a predetermined radius region. Therefore, for example, even when a retardation layer with a ±5% film thickness distribution, for the production reason, is disposed in between the liquid crystal cell and the polarizing plate, since those twist angles are different exist within a minute region, the bright and dark pattern is not generated in the display image. And thus, the display quality deterioration can be restrained effectively. The reason thereof is that, since those twist angles are different exist within a minute region, the human eyes cannot recognize the bright and dark pattern. Also, by setting the selective reflected wavelength of the selective reflected light of the above-mentioned cholesteric structure shorter than the wavelength of the incident light, the minute units (domains) are considerably smaller than the case when the selective reflected wavelength of the selected reflected light is set longer than the wavelength of the incident light. Thus, the uneven pattern observed in, for example, FIG. 2 of the above-described Y. Iimura et al., SID '94 Digest, 915 (1994) is not observed so as not to generate the bright and dark pattern.

The existence of those twist angles in the cholesteric structure are not substantially coincident can be confirmed by the observation of the cross-sectional surface of the retardation layer with a transmission type electron microscope, as in the above-mentioned fourth embodiment.

Moreover, "the twist angles in the cholesteric structure are not substantially coincident" denotes the same as described in the above-described column of the fourth embodiment.

In the present embodiment, it is preferable that those twist angles in the cholesteric structure are not substantially coincident exist at a location within a predetermined radius region by 10% or more, more preferably by 50% or more. Since those twist angles in the cholesteric structure are not substantially coincident exist in the above-mentioned range, the bright and dark pattern generated in the display image can be made more difficult to be recognizable, for sure.

Since the other points of the retardation layer are same as those mentioned in the above-mentioned first embodiment, explanation is not repeated here.

6. Sixth Embodiment

The sixth embodiment of the retardation layer of the present invention is a retardation layer having a fixed cholesteric structure, which functions as a negative C plate, and is characterized in that the retardation layer comprises, on a cross-sectional surface comprising a normal line to a surface of the retardation layer, within a 50 μm radius region, preferably within a 5 μm radius region, a helical axis structure region, in which an angle formed by the normal line and a helical axis of the helical axis structure region having the cholesteric structure is a clockwise acute angle from the normal line direction, and a helical axis structure region, in which the angle is a counterclockwise acute angle from the normal line direction.

Figure 5:
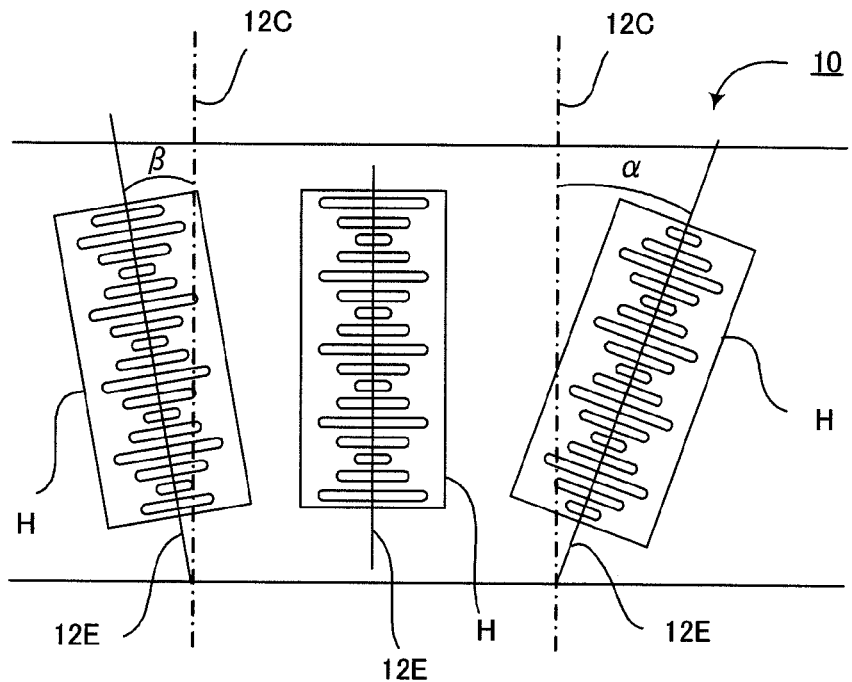
FIG. 5 is an explanatory diagram for explaining a retardation layer of the present invention.

Here, the helical axis structure region in this embodiment denotes, for example as shown in FIG. 5, among the cholesteric structure, a block structure H of a cholesteric liquid crystal having a helical axis 12E in a substantially constant direction, which has a substantially 1 pitch or more of the helical pitch.

Moreover, for example as shown in FIG. 5, the retardation layer 10 comprises a helical axis structure region H, in which the helical axis 12E forms an acute angle α in the clockwise direction with respect to the normal line 12C to the retardation layer 10, and a helical axis structure region H in which the helical axis 12E forms an acute angle β in the counterclockwise direction with respect to the normal line 12C of the retardation layer 10.

At the time, in the retardation layer, it is preferable that: a plurality of minute units (domains) having the cholesteric structure exists; within the minute unit (domain), the angles of the helical axis of the helical axis structure region are substantially coincident; and such minute units (domains) are in a state adjacent with each other.

Furthermore, it is more preferable that the selective reflected wavelength of the selective reflected light of the above-mentioned cholesteric structure is shorter than the wavelength of the incident light.

In the present embodiment, since the retardation layer comprises, on a cross-sectional surface comprising a normal line to a surface of the retardation layer, within a predetermined radius region, a helical axis structure region, in which an angle formed by the normal line and a helical axis of the helical axis structure region having the cholesteric structure is a clockwise acute angle from the normal line direction, and a helical axis structure region, in which the angle is a counterclockwise acute angle from the normal line direction, coalescence of numbers of the adjacent helical axis structure region, to become large domains, can be inhibited. Therefore, for example, even when a retardation layer with a ±5% film thickness distribution, for the production reason, is disposed in between the liquid crystal cell and the polarizing plate, the bright and dark pattern is not generated in the display image so that the display quality deterioration can be restrained efficiently. The reason thereof is that, since the retardation layer comprises a plurality of helical axis structure region, those having different helical axis angles, in a minute region, the human eyes cannot recognize the bright and dark pattern. Also, by setting the selective reflected wavelength of the selective reflected light of the above-mentioned cholesteric structure shorter than the wavelength of the incident light, the minute units (domains) are considerably smaller than the case when the selective reflected wavelength of the selected reflected light is set longer than the wavelength of the incident light. Thus, the uneven pattern observed in, for example, FIG. 2 of the above-described Y. Iimura et al., SID '94 Digest, 915 (1994) is not observed so as not to generate the bright and dark pattern.

In this embodiment, for example as shown in FIG. 5, the retardation layer may also have a helical axis structure region H having a helical axis 12E in the normal line direction of the above-mentioned retardation layer 10.

Here, specifically, as to the angle formed by the helical axis and the normal line to the retardation layer surface, one having a helical axis structure region in a range of 0 degree to 30 degrees, in particular, in a range of 0 degree to 10 degrees is preferable. When the above-mentioned angle is too large, due to generation of a wide width disclination, the bright and dark pattern may be generated, or the haze value is increased so as to cause the light leakage.

Moreover, it is preferable that the average value of the angle formed by each helical axis in the helical axis structure region and the normal line to the retardation layer surface is substantially 0 degree. Thereby, even when it is disposed in between the liquid crystal cell and the polarizing plate, the bright and dark pattern is not generated in the display image so that the display quality deterioration can be restrained further effectively.

In this embodiment, it is preferable that the helical axis structure region having the above-mentioned angle is included in a predetermined radius region by 10% or more, more preferably 50% or more. Since the helical axis structure region having the above-mentioned angle is included by the above-mentioned range, the bright and dark pattern generated in the display image can be made more difficult to be recognizable, for sure.

Figure 6:
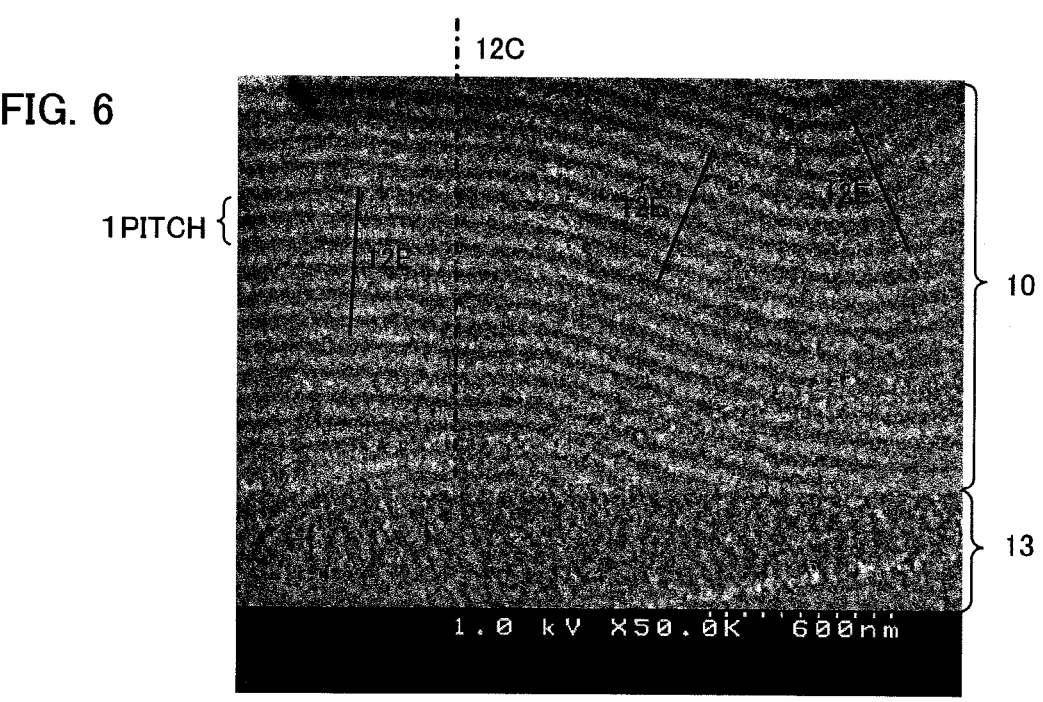
FIG. 6 is a transmission type electron microscope photograph showing another example of the cross-sectional surface of a retardation layer of the present invention.

The above-mentioned helical axis angle is referred to as the value obtained, for example as shown in FIG. 6, by measuring the angle of a helical axis 12E of the helical axis structure region, of whose helical pitch of the cholesteric structure is substantially one pitch or more, and the normal line 12C to the retardation layer 10 surface, from a photograph of a cross-sectional structure shot by a transmission electron microscope. Here, in the transmission electron microscope, for example as shown in FIG. 6, for the above-mentioned helical pitch of the cholesteric structure, two pairs of a line observed whitely and a line observed blackly form one pitch. Moreover, the axis direction of the above-mentioned helical axis 12E is the perpendicular direction to the line observed whitely or the line observed blackly. In FIG. 6, the reference numeral 13 is a TAC film and an alignment layer, and the TAC film, the alignment layer, and the retardation layer are laminated in this order.

Since the other points of the retardation layer are same as those mentioned in the above-mentioned first embodiment, explanation is not repeated here.

B. Retardation Optical Element

Next, the retardation optical element of the present invention will be explained. The retardation optical element of the present invention comprises a transparent base material, and the retardation layer explained in the above-mentioned column of "A. Retardation layer", formed on the above-mentioned transparent base material surface.

It is preferable that the retardation optical element of the present invention has an alignment layer formed on the above-mentioned transparent base material, and the above-mentioned retardation layer formed on the surface thereof. Hereinafter, the base material and the alignment layer will be explained. Since the retardation layer is same as those explained in the above-mentioned column of "A. Retardation layer", explanation is not repeated here.

1. Transparent Base Material

The transparent base material used in the retardation optical element of the present invention is not particularly limited as long as it is a material capable of transmitting a visible light, and it is preferably one formed with a material with little optical defect. Specifically, a glass substrate or a polymer film such as a TAC (cellulose triacetate) film can be used preferably.

2. Alignment Film

The alignment layer used in the present invention is not particularly limited. For example, those known and used as an alignment layer such as PI (polyimide), PVA (polyvinyl alcohol), HEC (hydroxyl ethyl cellulose), PC (polycarbonate), PS (polystyrene), PMMA (polymethyl methacrylate), PE (polyester), PVCi (polyvinyl cinnamate), PVK (polyvinyl carbazol), a polysilane containing cinnamoyl, a coumarin, and a chalcon can be used.

In the present invention, in particular, an alignment layer not subjected to the rubbing treatment can be used preferably. Thereby, the minute units (domains) in the retardation layer can be made smaller so as to restrain generation of the bright and dark pattern.

3. Others

In the present invention, a color filter layer may be formed in between the above-mentioned transparent base material and the above-mentioned retardation layer. Thereby, the transmission can be made higher by preventing the surface reflection between the transparent base material, the color filter layer, and the retardation layer.

C. Method for Manufacturing a Retardation Optical Element

Next, the method for manufacturing a retardation optical element of the present invention will be explained.

The method for manufacturing a retardation optical element of the present invention comprises: an alignment layer forming step of forming an alignment layer on a transparent base material; a coating step of coating a retardation layer forming coating solution, including a liquid crystal material having the cholesteric regularity for forming a cholesteric liquid crystal structure, on the alignment layer, in a state that a rubbing treatment is not subjected to the alignment layer; an alignment treatment step of subjecting an alignment treatment to the retardation layer formed on the alignment layer in the coating step; and a fixing step of fixing the cholesteric liquid crystal structure exhibited in a liquid crystal phase state in the retardation layer, by subjecting a solidifying treatment to the retardation layer aligned by the alignment treatment, so as to be fixed.

In such method for manufacturing a retardation optical element of the present invention, there are several aspects according to the kind of the liquid crystal material used for the retardation layer, the number of layers of the retardation layer, or the like. Hereinafter, the method for manufacturing a retardation optical element of the present invention will be explained separately for each aspect.

1. First Aspect

The first aspect of the method for manufacturing a retardation optical element of the present invention is an aspect of forming a retardation layer comprising one layer using a polymerizable monomer or a polymerizable oligomer.

Figure 7A:
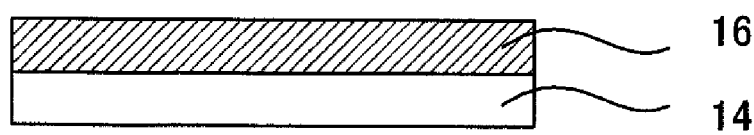
FIG. 7 is a process diagram for explaining an example of a method for manufacturing a retardation optical element of the present invention.
Figure 7B:
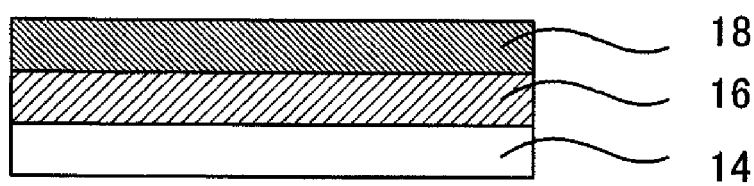
Figure 7C:
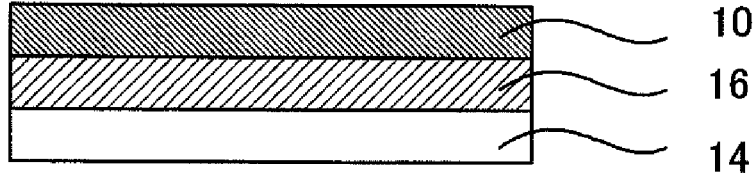

FIG. 7 is a process diagram showing an example of the method for manufacturing a retardation optical element of this aspect. First, an alignment layer 16 is formed on a transparent base material 14 (FIG. 7A: alignment layer forming step), a polymerizable monomer or a polymerizable oligomer 18 is coated on the above-mentioned alignment layer 16 (coating step), and it is aligned by the alignment limiting force of the above-mentioned alignment layer 16 (FIG. 7B: alignment treatment step). At the time, the coated polymerizable monomer or polymerizable oligomer 18 comprises a liquid crystal layer. Next, with the alignment state as it is, polymerization of the polymerizable monomer or polymerizable oligomer 18 is initiated by a preliminarily added photopolymerization initiator and an ultraviolet ray 110 irradiated from the outside, or polymerization is initiated directly by an electron beam 110, so that it is three dimensionally cross-linked (polymerized) and fixed. Thereby, a retardation layer 10 comprising one layer, which function as a negative C plate as mentioned above, can be formed (FIG. 7C: fixing step).

In this aspect, by leaving the alignment limiting force direction of the alignment layer in a random state, not subjecting to the rubbing treatment, the director direction of the liquid crystal molecules to be contacted therewith can be made substantially random in the contact plane, so as to produce a plurality of minute units (domains).

Moreover, the polymerizable monomer or polymerizable oligomer used in this aspect can be dissolved into a solvent, so as to be a coating solution, for lowering the viscosity for facilitating the coating operation. In this case, a drying step for evaporating the solvent is needed before the three dimensional cross linking by irradiating an ultraviolet ray or an electron beam. Preferably, a drying step for evaporating the solvent is carried out after carrying out the coating step of coating the coating solution, and then, an alignment step of aligning the liquid crystal may be carried out.

Furthermore, in the case the above-mentioned polymerizable monomer or polymerizable oligomer is formed into as a liquid crystal layer at a predetermined temperature, it will be in a nematic state. By adding an optional chiral agent, a chiral nematic liquid crystal phase (cholesteric liquid crystal phase) can be provided. Specifically, a chiral agent may be added by about several % to 20% to the polymerizable monomer or polymerizable oligomer. Moreover, by changing the chiral power by changing the kind of the chiral agent, or by changing the concentration of the chiral agent, the selective reflected wavelength, deriving from the molecular structure, of the polymerizable monomer or polymerizable oligomer can be controlled. In this aspect, it is preferable that the selective reflected wavelength is 380 nm or less, more preferably 280 nm or less.

The alignment layer used in the present aspect can be formed by conventionally known method. For example, the layer can be formed by a method in which a known film that can be used as an alignment layer, such as PI (polyimide), PVA (polyvinyl alcohol), HEC (hydroxyl ethyl cellulose), PC (polycarbonate), PS (polystyrene), PMMA (polymethyl methacrylate), PE (polyester), PVCi (polyvinyl cinnamate), PVK (polyvinyl carbazol), a polysilane containing cinnamoyl, a coumarin, and a chalcon, is formed into a film on the base material, and the rubbing treatment is not carried out.

In the case a polymer film such as a TAC film is used as the above-mentioned base material, it is preferable to provide a barrier layer on the base material so that the base material is not soaked in a solvent of the coating solution with the polymerizable monomer or the polymerizable oligomer dissolved. In this case, the above-mentioned alignment layer may also act as a barrier layer. For example, a water soluble substance such as a PVA can be used as the alignment layer.

2. Second Aspect

Next, the second aspect of the method for manufacturing a retardation optical element of the present invention will be explained. The second aspect of the method for manufacturing a retardation optical element of the present invention is an aspect of forming a retardation layer comprising one layer using a liquid crystal polymer.

Figure 8A:
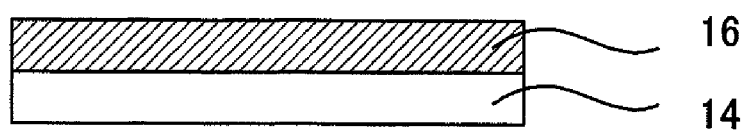
FIG. 8 is a process diagram for explaining another example of a method for manufacturing a retardation optical element of the present invention.
Figure 8B:
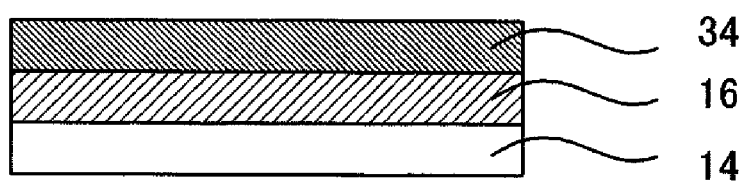
Figure 8C:
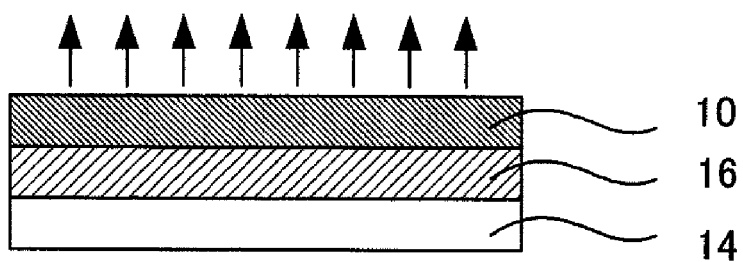

FIG. 8 is a process diagram showing an example of the method for manufacturing a retardation optical element of this aspect. First, an alignment layer 16 is formed on a transparent base material 14 (FIG. 8A: alignment layer forming step). Next, a liquid crystal polymer 34 having the cholesteric regularity is coated on the alignment layer 16 (coating step), and it is aligned by the alignment limiting force of the above-mentioned alignment layer 16 (FIG. 8B: alignment treatment step). At the time, the coated liquid crystal polymer 34 comprises a liquid crystal layer. Thereafter, by cooling the liquid crystal polymer 34 to the glass transition temperature (Tg) or lower, so as to be in a glass state, a retardation layer 10 comprising one layer can be formed (FIG. 8C: fixing step).

The liquid crystal polymer used in this aspect can be dissolved into a solvent, so as to be a coating solution, for lowering the viscosity for facilitating the coating operation. In this case, a drying step for evaporating the solvent is needed before the cooling. Preferably, a drying step for evaporating the solvent is carried out after carrying out the coating step of coating the coating solution, and then, an alignment step of aligning the liquid crystal may be carried out.

In the case a polymer film such as a TAC film is used as the base material used in this aspect, it is preferable to provide a barrier layer on the base material so that the base material is not soaked into a solvent, of the coating solution with the liquid crystal polymer dissolved, and to coat the liquid crystal thereon. In this case, the above-mentioned alignment layer may also act as the barrier layer. For example, a water soluble substance such as a PVA can be used as the alignment layer.

AS the liquid crystal polymer used in this aspect, a cholesteric liquid crystal polymer, a polymer itself having the chiral ability can be used, or a mixture of a nematic based liquid crystal polymer and a cholesteric based liquid crystal polymer may be used as well.

The state of such liquid crystal polymer is changed according to the temperature. For example in the case the glass transition temperature is 90° C. and the isotropic transition temperature is 200° C., the cholesteric liquid crystal state is exhibited between 90° C. and 200° C. By cooling the same to the room temperature, it can be solidified in a glass state while maintaining the cholesteric structure.

Moreover, as a method for adjusting the selective reflected wavelength of the incident light deriving from the molecular structure of the cholesteric regularity of the above-mentioned liquid crystal polymer, in the case a cholesteric liquid crystal polymer is used, the chiral power in the liquid crystal molecule can be adjusted by a known method. Moreover, in the case a mixture of a nematic based liquid crystal polymer and a cholesteric based liquid crystal polymer is used, the mixture ratio thereof can be adjusted. In this aspect, the selective reflected wavelength is 380 nm or less, preferably 280 nm or less.

Moreover, if the direction of the alignment limiting force of the alignment layer used in this aspect is left randomly in the entire range on the alignment layer, the directors of the liquid crystal molecules on one side surface of the retardation layer to be contacted therewith can be made substantially random in the contact plane, so that a plurality of minute units (domains) can be formed.

3. Third Aspect

Next, the third aspect of the method for manufacturing a retardation optical element of the present invention will be explained. The third aspect of the method for manufacturing a retardation optical element of the present invention is an aspect of forming a multiple layered laminated retardation layer using a polymerizable monomer or a polymerizable oligomer.

Although both of the retardation optical elements in the above-mentioned first and second aspects are for the method for manufacturing a retardation optical element having a single layer configuration comprising a retardation layer of one layer, the present invention is not limited thereto. It also includes a method for manufacturing a retardation optical element having multiple layered laminated retardation layers.

Figure 9A:
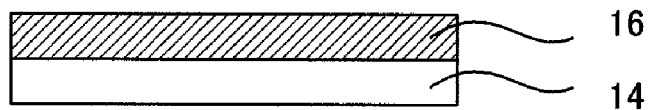
FIG. 9 is a process diagram for explaining another example of a method for manufacturing a retardation optical element of the present invention.
Figure 9B:
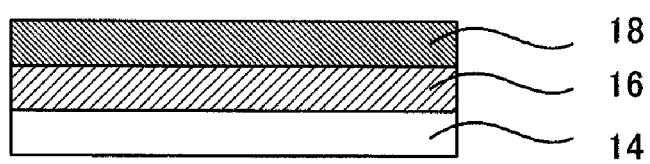
Figure 9C:
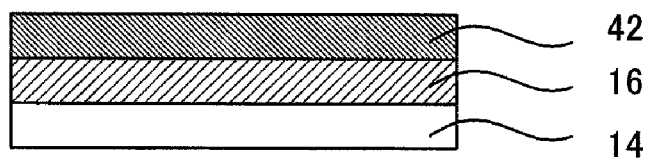
Figure 9D:
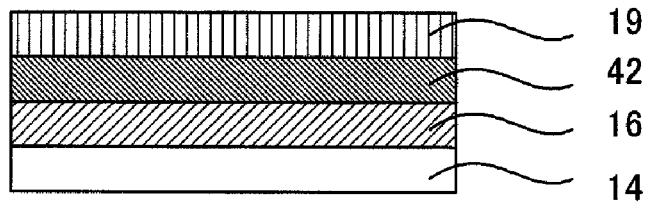
Figure 9E:
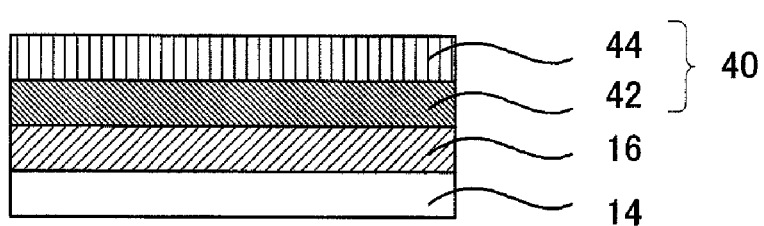

Specifically, as shown in FIG. 9E, a plurality of retardation layers 42, 44 having the molecular structure of the planer aligned cholesteric regularity may be laminated directly and successively. In such a laminated retardation layer 40 having the multiple layer configuration, various optical compensations can also be realized by using layers having different birefringence values, helical pitches or the like as the retardation layers 42, 44.

In the retardation layer 40 of such a multiple layer configuration, the two major surfaces, facing with each other, located on the outermost surfaces of the retardation layers 42, 44, the directors of the liquid crystal molecules in each minute unit (domain) are substantially coincident. However, the directors of each minute unit (domain) are not substantially coincident with each other.

Figure 10:
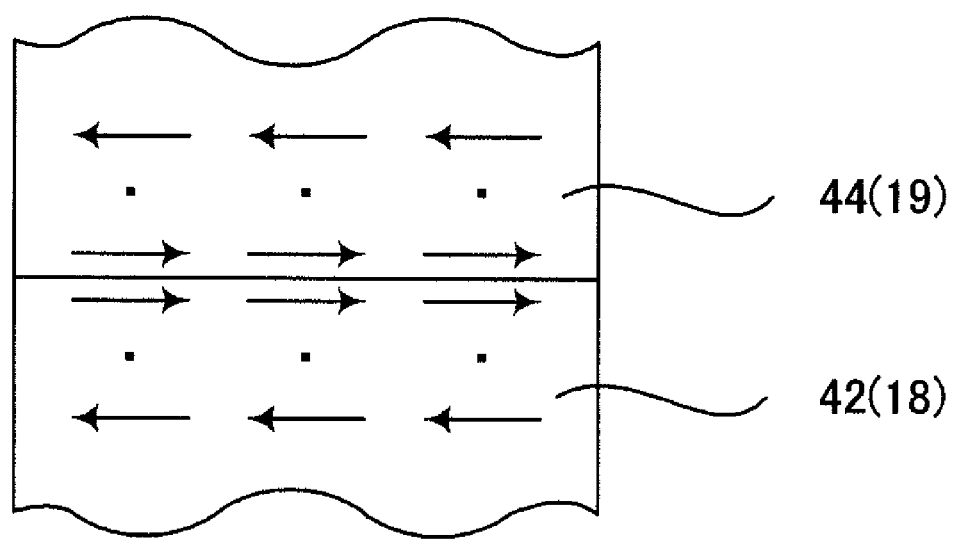
FIG. 10 is a schematic diagram showing the directors of the liquid crystal molecules at the adjacent surface between the layers in the retardation layers of a multiple layered structure, among the retardation layers according to an example of the present invention.
Figure 11A:
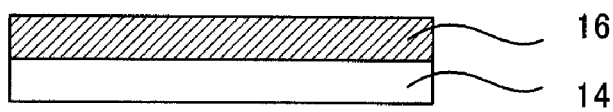
FIG. 11 is a process diagram for explaining another example of a method for manufacturing a retardation optical element of the present invention.
Figure 11B:
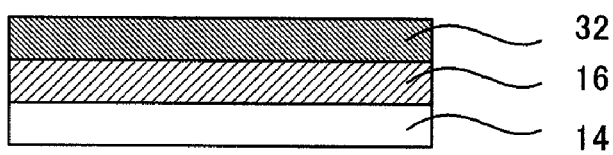
Figure 11C:
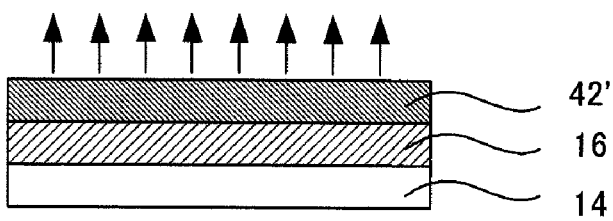
Figure 11D:
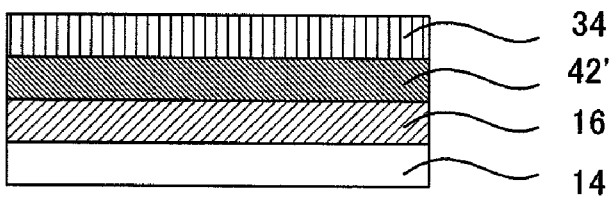
Figure 11E:
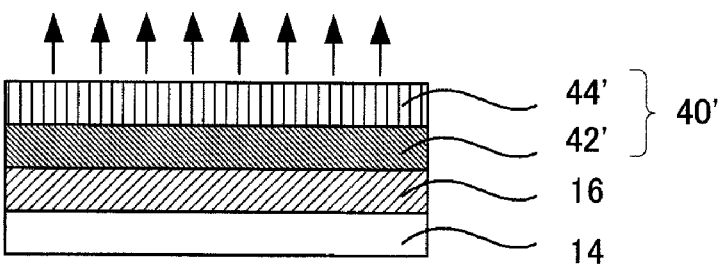

FIG. 9 is a process diagram showing an example of a method for manufacturing a retardation optical element of this aspect. First, an alignment layer 16 is formed on a transparent base material 14 (FIG. 9A: alignment layer forming step), a coating solution 18 including a polymerizable monomer or a polymerizable oligomer as a liquid crystal molecule is coated on the above-mentioned alignment layer 16 (coating step), and it is aligned by the alignment limiting force of the above-mentioned alignment layer 16 (FIG. 9B: alignment treatment step). Next, with the alignment state as it is, by solidifying the polymerizable monomer or polymerizable oligomer 18 by three dimensionally cross linking by using a photopolymerization initiator and irradiating an ultraviolet ray 110, or by irradiating an electron beam 110 alone, a first retardation layer 42 can be formed (FIG. 9C: fixing step). Furthermore, a second coating solution 19, containing other polymerizable monomer molecule or polymerizable oligomer molecule prepared separately, is directly coated on the three dimensionally cross linked first retardation layer 42 (FIG. 9D). At the time, as shown in FIG. 10, by aligning by the alignment limiting force of the surface of each minute unit (domain) of the three dimensionally cross linked retardation layer 42, and by three dimensionally cross linking in this state, so as to be solidified, by using a photopolymerization initiator and irradiating an ultraviolet ray 110, or by irradiating an electron beam 110 alone, the second retardation layer 44 can be formed (FIG. 9E).

Moreover, in the case of providing a multiple layer configuration of three or more layers, the necessary number of retardation layers may be laminated successively by repeating the same step as mentioned above (FIG. 9D to E).

The polymerizable monomer or polymerizable oligomer used in this aspect can be dissolved into a solvent, so as to be a coating solution, for lowering the viscosity for facilitating the coating operation. In this case, a drying step for evaporating the solvent is needed before it is three dimensionally cross-linked by irradiating the ultra violet ray or the electron beam. Preferably, a drying step for evaporating the solvent is carried out after carrying out the coating step of coating the coating solution, and then, an alignment step of aligning the liquid crystal may be carried out.

Moreover, if the direction of the alignment limiting force of the alignment layer used in this aspect is left substantially at random in the entire range on the alignment layer, the directors of the liquid crystal molecules to be contacted therewith can be made substantially random in the contact plane.

Moreover, it is preferable that the liquid crystalline materials used for forming the retardation layer and the second retardation layer have the substantially same components. Thereby, the substance transfer between the retardation layer 42 and the second retardation layer 44 can be substantially prevented so that a retardation optical element as a laminated member of a further uniform retardation layer can be manufactured.

4. Fourth Aspect

Next, the fourth aspect of the method for manufacturing a retardation optical element of the present invention will be explained. The third aspect of the method for manufacturing a retardation optical element of the present invention is an aspect of forming a multiple layered laminated retardation layer using a liquid crystal polymer.

FIG. 11 is a process diagram showing an example of a method for manufacturing a retardation optical element of this aspect. First, an alignment layer 16 is formed on a transparent base material 14 (FIG. 11A: alignment layer forming step), next, a liquid crystal polymer 32 having the cholesteric regularity is coated on the alignment layer 16 (coating step), and it is aligned by the alignment limiting force of the alignment layer 16 (FIG. 11B: alignment treatment step). By cooling the liquid crystal polymer 32 to the glass transition temperature (Tg) or lower so as to be in a glass state, a first retardation layer 42' is formed (FIG. 11C: fixing step). Thereafter, by directly coating other liquid crystal polymer 34 having the cholesteric regularity prepared separately on the first retardation layer 42', aligning the same by the alignment limiting force of the surface of the first liquid crystal layer 42' in the glass state (FIG. 11D), and cooling the liquid crystal polymer 34 to the glass transition temperature (Tg) or lower so as to be in a glass state, a second retardation layer 44' can be formed (FIG. 11E).

Moreover, in the case of providing a multiple layer configuration retardation layer of three or more layers, the same step as mentioned above (FIG. 11D to E) may be repeated.

If the direction of the alignment limiting force of the alignment layer used in this aspect is left substantially at random in the entire range on the alignment layer, the directors of the liquid crystal molecules to be contacted therewith can be made substantially random in the contact plane.

D. Polarizing Element

Next, a polarizing element of the present invention will be explained.

The polarizing element of the present invention is characterized in that, in the transparent base material of the retardation optical element explained in the above-mentioned column of "B. Retardation optical element", a polarizing layer is disposed on the surface on which the retardation layer is not formed.

Since in such a polarizing element, a polarizing layer is provided on at least one surface of the above-mentioned retardation optical element, reflection at the surface of the retardation optical element will be extremely small so that the generation of the bright and dark pattern can effectively be restrained, as well as the contrast can be improved. Thus, the display quality deterioration can be effectively restrained.

Figure 12:
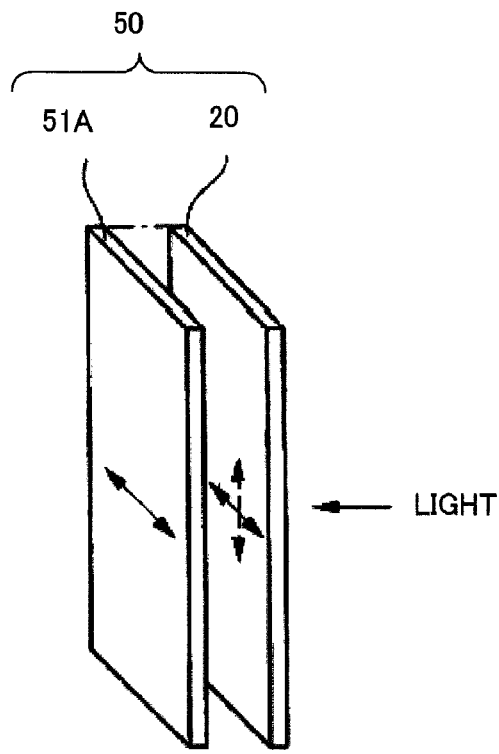
FIG. 12 is a schematic exploded perspective view showing an example of a polarizing element provided with a retardation layer of the present invention.

FIG. 12 is a schematic perspective view showing an example of a polarizing element of the present invention. As shown in FIG. 12, the polarizing element 50 of the present invention comprises a polarizing layer 51A, and a retardation optical element 20 disposed on the surface on the light input side of the polarizing layer 51A. Although the retardation optical element 20 and the polarizing layer 51A are drawn separately with each other in FIG. 12, they are provided in a state attached with each other.

By accordingly attaching the polarizing layer 51A onto the surface, on which the retardation layer is not formed, in the transparent base material of the retardation optical element 20, reflection at the surface of the retardation optical element 20 will be extremely small so that the generation of the bright and dark pattern can effectively be restrained, as well as the contrast can be improved. Thus, the display quality deterioration can be effectively restrained.

As the polarizing layer used at the time, those used in general for a liquid crystal display apparatus can be used. Moreover, since the retardation optical element used in the present invention is same as those mentioned in the above-mentioned "A. Retardation optical element", explanation is not repeated here.

E. Liquid Crystal Display Apparatus

Finally, a liquid crystal display apparatus of the present invention will be explained.

The liquid crystal display apparatus of the present invention is a liquid crystal display apparatus comprising: a liquid crystal cell; a pair of polarizing plates disposed so as to interpose the liquid crystal cell; and the above-described retardation optical element disposed in between the liquid crystal cell and at least one of the pair of the polarizing plates, characterized in that the above-mentioned retardation optical element compensates the polarizing state of the light in a inclined direction with respect to the normal line of the above-mentioned liquid crystal cell. Thereby, generation of the bright and dark pattern in the liquid crystal display apparatus can be restrained, as well as the contrast can be improved. Thus, the display quality deterioration can be restrained.

Figure 13:
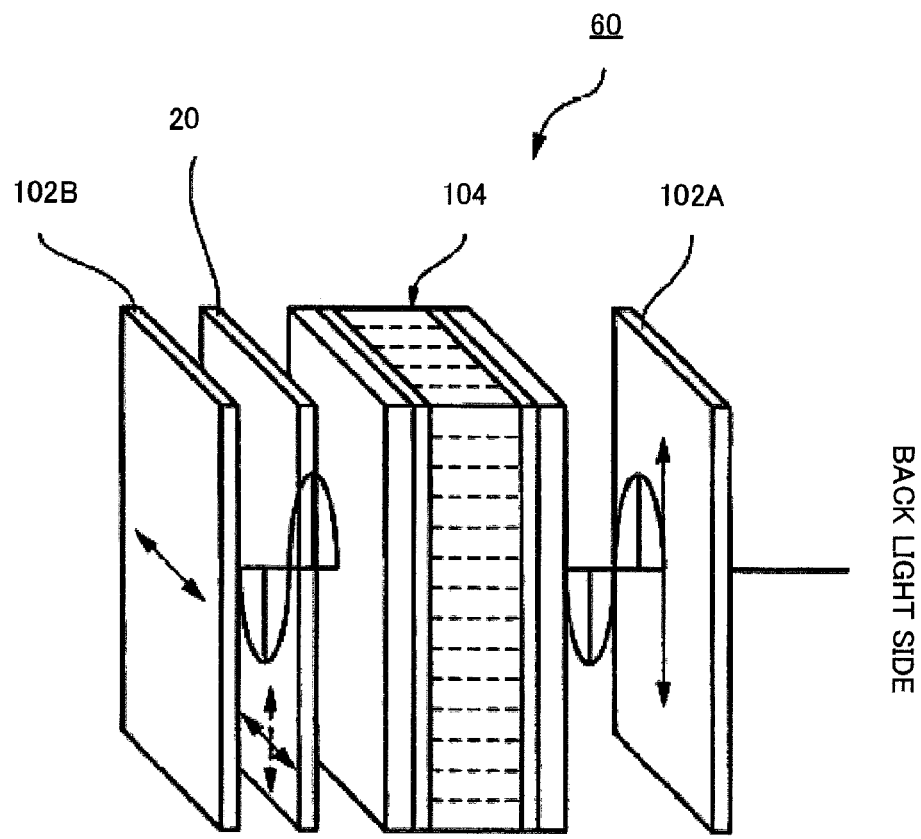
FIG. 13 is a schematic exploded perspective view showing an example of a liquid crystal display apparatus provided with a retardation layer of the present invention.

FIG. 13 is a perspective view showing an example of a liquid crystal display apparatus of the present invention. As shown in FIG. 13, the liquid crystal display apparatus 60 of the present invention comprises an incident side polarizing plate 102A, an output side polarizing plate 102B, and a liquid crystal cell 104. The polarizing plates 102A, 102B have configuration so that only a liner polarized light, having a vibration surface in a predetermined vibration direction, are selectively transmitted. Therefore, they are disposed facing with each other in the cross Nicol state so that each vibration direction is perpendicular to each other. Moreover, the liquid crystal cell 104 including a large number of cells corresponding to the pixels, and is disposed in between the polarizing plates 102A, 102B.

Here, in the liquid crystal display apparatus 60, the liquid crystal cell 104 employs the VA system in which a nematic liquid crystal having a negative dielectric anisotropy is sealed. For the linearly polarized light, which is transmitted through the incident side polarizing plate 102A, its phase is not shifted when it is transmitted through the non-driven state cell portion, among the liquid crystal cell 104, so as to be blocked by the output side polarizing plate 102B. On the other hand, the phase of the linearly polarized light is shifted when it is transmitted through the driven state cell portion, among the liquid crystal cell 109, so that the amount of light corresponding to the phase shift amount is transmitted through the output side polarizing plate 102B so as to be output. Thereby, by optionally controlling the driving voltage of the liquid crystal cell 104 per each cell, a desired image can be displayed on the output side polarizing plate 102B side.

In the liquid crystal display apparatus 60 having such configuration, the above-mentioned retardation optical element 20 of the above-described embodiment is disposed in between the liquid crystal cell 104 and the output side polarizing plate 102B (polarizing plate which selectively transmits a light of a predetermined polarization state output from the liquid crystal cell 104). By the retardation optical element 20, the polarization state of the output light in a inclined direction with respect to the normal line to the liquid crystal cell 104, among the output light from the liquid crystal cell 104 of a predetermined polarization state, can be compensated.

As mentioned above, in the liquid crystal display apparatus 60 of the above-mentioned configuration, the retardation optical element 20 according to the above-mentioned embodiment is disposed in between the liquid crystal cell 104 of the liquid crystal display apparatus 60 and the output side polarizing plate 102B, and the polarization state of the output light in a inclined direction with respect to the normal line to the liquid crystal cell 104, among the output light from the liquid crystal cell 104, is compensated. Therefore, while effectively improving the problem of the viewing angle dependency, generation of the bright and dark pattern in the liquid crystal display apparatus 60 is restrained, as well as the contrast can be improved. Thus, the display quality deterioration can be restrained.

Although the liquid crystal display apparatus 60 shown in FIG. 13 is of a transmission type of transmitting a light from one side in the thickness direction to the other side, this embodiment is not limited thereto. The retardation optical element 20 according to the above-mentioned embodiment can also be used in state assembled in a reflection type liquid crystal display apparatus in the same manner.

Moreover, in the liquid crystal display apparatus 60 shown in FIG. 13, the retardation optical element 20 according to the above-mentioned embodiment is disposed in between the liquid crystal cell 104 and the output side polarizing plate 102B. However, depending on the optical compensation aspect, the retardation optical element 20 may be disposed in between the liquid crystal cell 104 and the incident side polarizing plate 102A. Moreover, the retardation optical element 20 may be disposed on both sides of the liquid crystal cell 104 (between the liquid crystal cell 104 and the incident side polarizing plate 102A, and between the liquid crystal cell 104 and the output side polarizing plate 102B). The retardation optical element to be disposed in between the liquid crystal cell 104 and the incident side polarizing plate 102A, or between the liquid crystal cell 104 and the output side polarizing plate 102E is not limited to one, but it may be disposed in a plurality.

In the present invention, it is particularly preferable that the above-mentioned liquid crystal cell 104 is formed with a liquid crystal layer of the VA (vertical alignment) system. That is because generation of the bright and dark pattern in the liquid crystal display apparatus can be restrained, as well as the contrast can be improved. Thus, the display quality deterioration can further be restrained.

The present invention is not limited to the above-mentioned embodiments. The above-mentioned embodiments are examples, and any one having substantially same configuration and achieving the same functions and effects as the technological idea disclosed in the range of the claims of the present invention is included in the technological scope of the present invention.

EXAMPLES

Next, the present invention will be described with reference to the examples and the comparative examples.

Example 1

In the example 1, a retardation layer of a single layer was formed on a glass substrate.

A toluene solution, in which 90 parts by weight of a monomer molecule (one having a molecular structure represented by the above-mentioned chemical formula (11)) and 10 parts by weight of a chiral agent molecule (one having a molecular structure represented by the above-mentioned chemical formula (14)) are dissolved, was prepared. The nematic-isotropic transition temperature of the monomer molecule was 110° C. The monomer molecule comprises a polymerizable acrylate on the both ends, and also comprises a spacer in between a mesogen in the central part and the acrylate. The chiral agent molecule comprises a polymerizable acrylate on the both ends. To the above-mentioned toluene solution, 5% by weight, with respect to the above-mentioned monomer molecule, of a photopolymerization initiator (IRGACURE (registered trademark) 907 manufactured by Chiba Speciality Chemicals) was added. On the other hand, a polyimide dissolved in a solvent (OPTMER (registered trademark) AL1254 manufactured by JSR Corporation) was spin coated on a transparent glass substrate with a spin coater. After drying, a film was formed at 200° C. (film thickness: 0.1 μm) so as to provide an alignment layer. However, the rubbing treatment was not carried out.

Such glass substrate with an alignment layer was set on a spin coater. The toluene solution, with the above-mentioned monomer molecule and the like dissolved, was spin coated under a condition for providing a film of even thickness, as possible. Next, the toluene in the above-mentioned toluene solution was evaporated at 80° C.

Then, the acrylate of the monomer molecule was three dimensionally cross linked, so as to be polymerized, by irradiating an ultraviolet ray to the above-mentioned coating film so that a radial is generated from the photopolymerization initiator in the coating film. Thus, a retardation optical element having a retardation layer of a single layer was produced. The film thickness of the coated film at the time was 2 μm±1.5%. Moreover, according to the measurement with a spectrophotometer, the central wavelength of the selective reflected wavelength of the coated film was 280 nm. Since the refractive index of the cured liquid crystal molecule was about 1.5, the film thickness per 1 pitch calculated from P=k/n was about 190 nm. Therefore, the number of pitches of the retardation layer was 2,000/190=about 11 pitches.

Moreover, the retardation optical element produced accordingly was measured using an automatic birefringence measuring device (KOBRA (registered trademark) 21ADH manufactured by Oji Scientific Instruments). Thus, the following facts were confirmed: the phase difference in the plane direction was 1 nm, which is within the error range of the measuring device; the phase difference in the thickness direction was about 100 nm; and the layer functions as a negative C plate.

According to the observation of the cross-sectional surface of the produced retardation layer with a transmission type electron microscope, a plurality of minute units (domains) were observed, the surface directors were in a random state so that they are not coincident with each other, and the twist angles of the plurality of the minute units (domains) were not coincident with each other. Further, the size of the minute unit (domain) surface was not recognized with naked eyes.

The haze value measured of the produced retardation layer based on the JIS-K7105 was 2%. The maximum value of the leaked light measured in a range of 380 nm to 700 nm, at the time of measuring the retardation layer interposed between the polarizing plates in the cross Nicol state, was 1%, with a premise that the leaked light at the time of measuring from the normal line direction with the polarizing plates in the cross Nicol state is 0% and the leaked light at the time of measuring from the normal line direction with the polarizing plates in the parallel state is 100%.

Figure 14:
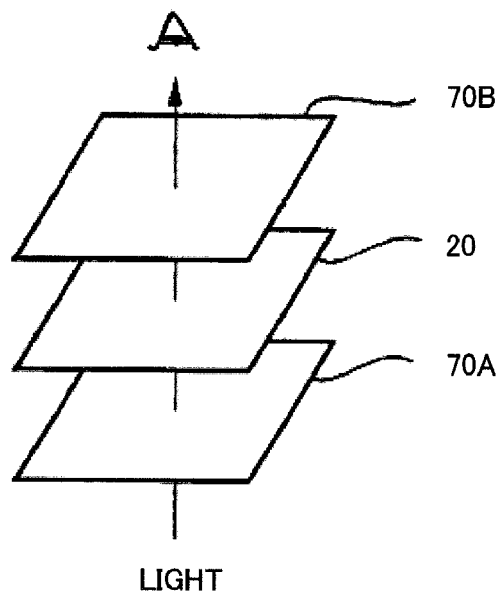
FIG. 14 is a schematic exploded perspective view showing the configuration in the case of observing a retardation optical element in a state interposed between the polarizing plates.
Figure 15:
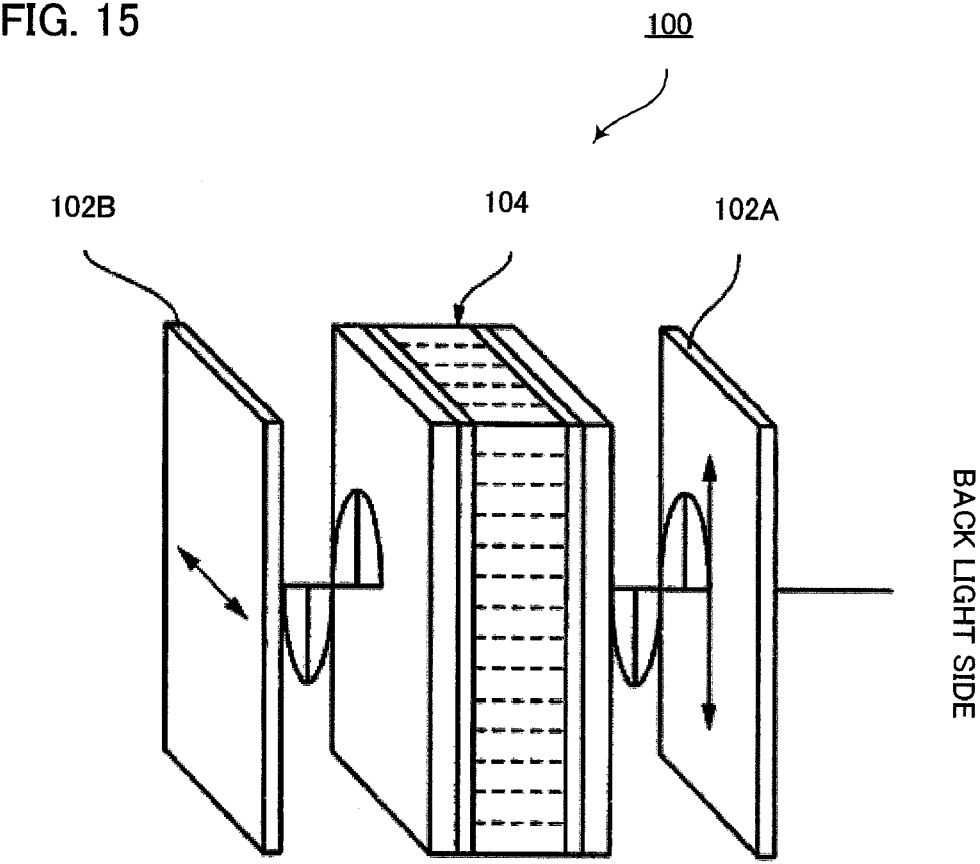
FIG. 15 is a schematic exploded perspective view showing the conventional liquid crystal display apparatus.

Furthermore, as shown in FIG. 14, the produced retardation optical element 20 was interposed between linear polarizing plates 70A, 70B, disposed in a cross Nicol state, for the visual observation. There was no bright and dark pattern observed in the plane.

Example 2

In the example 2, a retardation layer of a single layer comprising a polymerizable monomer molecule was formed on a polymer film. That is, a retardation optical element was produced in the same manner as in the example 1, except that a PVA solution, dissolved in pure water so as to have the 2% by weight concentration, was coated on a transparent TAC film by bar coating, formed into a film at 100° C. (film thickness: 0.2 µm) after drying, so as to function as an alignment layer. As a result, in the retardation optical element produced accordingly, similar result as in the example 1 was obtained. However, the haze value and the leaked light maximum value were smaller than those of the example 1, and they were 1%, 0.8%, respectively. The retardation layer produced in the example 1 and the retardation layer produced in the example 2 were compared with each other, with a polarization microscope. The size of a plurality of the minute units (domains) was smaller in the example 2. Although the maximum major axis of the inscribed ellipse of the minute units (domains) was 5 µm, the light leakage from the disclination between the plurality of the minute units (domains) was observed.

Example 3

In the example 3, a retardation optical element was produced in the same manner as in the example 2, except that a HEC (hydroxyl ethyl cellulose) functions as an alignment layer. As a result, in the retardation optical element produced accordingly, similar result as in the example 2 was obtained. However, the haze value and the leaked light maximum value were smaller than those of the example 2, and they were 0.5%, 0.08%, respectively. The retardation layer produced in the example 2 and the retardation layer produced in the example 3 were compared with each other, with a polarization microscope. The size of a plurality of the minute units (domains) was smaller in the example 3. According to the actual measurement by a TEM photograph, the maximum major axis of the inscribed ellipse of the minute units (domains) was 1.5 µm. Moreover, the disclination was to the degree that it cannot be measured by the TEM photograph.

Example 4

In the example 4, the film thickness of a retardation layer of a single layer comprising a polymerizable monomer molecule was provided unevenly. That is, a retardation optical element was produced in the same manner as in the example 1, except that the film thickness was made into 2 µm±5% by changing the spin coater condition. According to the observation in the same manner, as in the example 1, the bright and dark pattern was not observed in the plane. However, according to the observation of the cross-sectional surface of the produced retardation layer, with a transmission type electron microscope, the helical axis of the plurality of the minute units (domains) and the normal line to the retardation layer surface are not coincident. The average value of the angle formed by each helical axis and the above-mentioned normal line was 0 degree.

Comparative Example 1

In the comparative example 1, the directors of the liquid crystal monomers were made coincident by rubbing an alignment layer, on which a retardation layer of a single layer comprising a polymerizable monomer molecule is to be formed. That is, a retardation optical element produced in the same manner as in the example 1 except that the rubbing direction of the alignment layer was homogeneous in the plane. The element was observed in the same manner, and a clear bright and dark pattern was observed in the plane.

Example 5

In the example 5, a retardation element having multiple layered retardation layers comprising a polymerizable monomer molecule was produced.

Providing the retardation layer produced in the example 1 as the first retardation layer, a toluene solution prepared in the same manner as in the example 1 was spin coated on the opposite side surface of the alignment layer, by a rotational frequency higher than that of the example 1. Next, the toluene in the above-mentioned toluene solution was evaporated at 80° C.

Then, by irradiating an ultraviolet ray to the above-mentioned coated film, the acrylate of the monomer molecule was three dimensionally cross linked, so as to be polymerized, by the radical generated from the photopolymerization initiator in the coating film for forming a second retardation layer, and a multiple layered retardation optical element was produced. The total film thickness at the time was 3.5 µm±1.5%. Moreover, according to the measurement with a spectrophotometer, the central wavelength of the selective reflected wavelength of the coated film of the retardation layer of the multiple layered configuration was 280 nm.

According to the observation of the cross-sectional surface of a plurality of the retardation layers, with a transmission type electron microscope, the bright and dark pattern between the polymerized retardation layers was in a parallel state with each other (from this, it is learned that the helical axis directions are coincident), and the fault was not observed between the retardation layers (from this, it is learned that the directors of the liquid crystal molecules between the surfaces of the adjacent retardation layers are coincident). Moreover, a plurality of minute units (domains) was observed.

Furthermore, as shown in FIG. 14, the produced retardation optical element 20 was interposed in between linear polarizing plates 70A, 70B, provided in the cross Nicol state, for the visual observation. There was no bright and dark pattern observed in the plane.

Example 6

In the example 6, the film thickness of a multiple layered retardation layer, comprising a polymerizable monomer molecule, was provided unevenly. That is, a retardation optical element produced in the same manner as in the example 4 except that the total film thickness was 3.5 μm±5%, by changing the spin coater condition, was observed in the same manner. The bright and dark pattern was not observed in the plane.

Example 7

In the example 7, a multiple layered retardation layer comprising a liquid crystal polymer was produced.

A toluene solution with an acrylic based side chain type liquid crystal polymer, having a glass transition temperature of 80° C. and an isotropic transition temperature of 200° C., dissolved was prepared. On the other hand, a polyimide dissolved in a solvent (OPTMER (registered trademark) AL1254 manufactured by JSR Corporation) was spin coated on a transparent glass substrate with a spin coater. After drying, a film was formed at 200° C. (film thickness: 0.1 μm) so as to function as an alignment layer. However, the rubbing treatment was not carried out.

Then, with such glass substrate with an alignment layer set on a spin coater, the toluene solution with the above-mentioned liquid crystal polymer dissolved was spin coated under a condition for providing an even film thickness, as possible.

Next, the toluene in the above-mentioned toluene solution was evaporated at 90° C. Furthermore, the coated film formed on the alignment layer was maintained at 150° C. for 10 minutes. Furthermore, by cooling the above-mentioned coated film to the room temperature, the liquid crystal polymer was in a glass state and fixed for forming a retardation layer. The film thickness at the time was 2 μm±1.5%. Moreover, according to the measurement with a spectrophotometer, the central wavelength of the selective reflected wavelength of the first retardation layer was 370 nm.

Furthermore, on the retardation layer fixed in a glass state, a toluene solution with an acrylic based side chain type liquid crystal polymer, having a glass transition temperature of 75° C. and an isotropic transition temperature of 190° C., dissolved was spin coated by a rotational frequency higher than the former.

Next, the toluene in the above-mentioned toluene solution was evaporated at 90° C. Furthermore, the above-mentioned coated film was maintained at 150° C. for 10 minutes. Furthermore, by cooling the above-mentioned coated film to the room temperature, the liquid crystal polymer was in a glass state and fixed for forming a second retardation layer and producing a multiple layered retardation optical element. The total film thickness at the time was 3.5 mm±1.5%. Moreover, according to the measurement with a spectrophotometer, the central wavelength of the selective reflected wavelength of the coated film of the retardation layer of a multiple layer configuration was 370 nm.

According to the observation of the cross-sectional surface of a plurality of the retardation layers with a transmission type electron microscope, the bright and dark pattern between the fixed retardation layers was in a parallel state with each other (from this, it is learned that the helical axis directions are coincident), and the fault was not observed between the retardation layers (from this, it is learned that the directors of the liquid crystal molecules between the surfaces of the adjacent liquid crystal layers are coincident). Moreover, a plurality of minute units (domains) was observed.

Furthermore, as shown in FIG. 14, the produced retardation optical element 20 was interposed in between linear polarizing plates 70A, 70B, provided in the cross Nicol state, for the visual observation. There was no bright and dark pattern observed in the plane.

Example 8

In the example 8, the film thickness of a multiple layered liquid crystal layer, comprising a liquid crystal polymer, was provided unevenly so as to disturb the directors of the liquid crystal molecules. That is, a retardation optical element produced in the same manner as in the example 6 except that the total film thickness was 3.5 μm±5% by changing the spin coater condition was observed in the same manner. The bright and dark pattern was not observed in the plane.

Comparative Example 2

In the comparative example 2, a retardation layer was produced in the same manner as in the example 1, except that the selective reflected wavelength of the cholesteric structure was 600 nm, 800 nm, respectively. As a result, in the retardation layers having 600 nm and 800 nm selective reflected wavelengths, an opaque phenomenon clearly recognized visibly was observed. The degree of the opaqueness was larger for the retardation layer of the 800 nm selective reflected wavelength, which is to a degree that it cannot be used as a retardation layer. Moreover, the retardation layer of the 600 nm selective reflected wavelength reflects a green light, and it was also to a degree that it cannot be used as a retardation layer.

INDUSTRIAL APPLICABILITY

In the retardation layer of the present invention, bright and dark pattern is not generated in the display image even when it is disposed in between the liquid crystal cell and the polarizing plate. Thus, the display quality deterioration can be restrained effectively.

The invention claimed is:

1. A retardation layer, which functions as a negative C plate, comprising a fixed cholesteric structure in which, at least on one surface of two major surfaces of the retardation layer, liquid crystal molecules, whose directors are not substantially coincident, exist within an interval of 100 μm.

2. A retardation layer according to claim 1, in which, also on the other surface of the two major surfaces of the retardation layer, liquid crystal molecules, whose directors are not substantially coincident, exist within an interval of 100 μm.

3. A retardation layer, which functions as a negative C plate, comprising a fixed cholesteric structure in which, at least on one surface of two major surfaces of the retardation layer, liquid crystal molecules, whose directors are not substantially coincident, exist within a 50 μm radius region.

4. A retardation layer, which functions as a negative C plate, comprising a fixed cholesteric structure in which, on a major surface of the retardation layer, those twist angles in the cholesteric structure are not substantially coincident exist at a location within an interval of 100 μm.

5. A retardation layer, which functions as a negative C plate, comprising a fixed cholesteric structure in which, on a major surface of the retardation layer, those twist angles in the cholesteric structure are not substantially coincident exist at a location within a 50 μm radius region.

6. A retardation layer, which functions as a negative C plate, comprising a fixed cholesteric structure in which the retardation layer comprises, on a cross-sectional surface comprising a normal line to a surface of the retardation layer, within a 50 μm radius region, a helical axis structure region, in which an angle formed by the normal line and a helical axis of the helical axis structure region having the cholesteric structure is a clockwise acute angle from the normal line direction, and a helical axis structure region, in which the angle is a counterclockwise acute angle from the normal line direction.

7. The retardation layer according to claim 1, wherein a plurality of minute units (domains) having the cholesteric structure exist.

8. The retardation layer according to claim 1, wherein a selective reflected wavelength of a selective reflected light of the cholesteric structure is shorter than the wavelength of an incident light.

9. The retardation layer according to claim 7, wherein a maximum major axis of an inscribed ellipse on a surface of the minute units (domains) is 40 μm or less.

10. The retardation layer according to claim 9, wherein the maximum major axis of the inscribed ellipse on the surface of the minute units (domains) is same as or shorter than the wavelength of the incident light.

11. The retardation layer according to claim 7, wherein an alignment defect (disclination) distance between the minute units (domains) is same as or shorter than the wavelength of the incident light.

12. The retardation layer according to claim 1, wherein a haze value, when the retardation layer is measured based on the JIS-K7105, is 2% or less.

13. The retardation layer according to claim 1, wherein the maximum value of the leaked light measured in a range of 380 nm to 700 nm, at the time of measuring the retardation layer interposed between the polarizing plates in the cross Nicol state, is 1% or less, with a premise that the leaked light at the time of measuring from the normal line direction with the polarizing plates in the cross Nicol state is 0% and the leaked light at the time of measuring from the normal line direction with the polarizing plates in the parallel state is 100%.

14. The retardation layer according to claim 1, wherein the helical axis of the minute units (domains) having the cholesteric structure and the normal line to the retardation layer surface are not substantially coincident.

15. The retardation layer according to claim 14, wherein an average value of the angle formed by the helical axis of the minute units (domains) having the cholesteric structure and the normal line to the retardation layer surface is substantially 0 degree.

16. The retardation layer according to claim 1, wherein a second retardation layer is further laminated on the major surface of the retardation layer.

17. The retardation layer according to claim 15, wherein both of the selective reflected lights of the retardation layer and the second retardation layer have the substantially coincident selective reflected wavelength.

18. The retardation layer according to claim 1, wherein the retardation layer has a molecular structure of a three dimensionally cross-linked chiral nematic liquid crystal.

19. The retardation layer according to claim 1, wherein the retardation layer has a molecular state of a polymer cholesteric liquid crystal in a glass state.

20. A retardation optical element comprising a transparent base material, and the retardation layer according to claim 1 formed on the transparent base material surface.

21. The retardation optical element according to claim 20, wherein an alignment layer is formed in between the transparent base material and the retardation layer.

22. The retardation optical element according to claim 20, wherein a color filter layer is formed in between the transparent base material and the retardation layer.

23. A polarizing element characterized in that, in the transparent base material of the retardation optical element according to claim 20, a polarizing layer is disposed on a surface on which the retardation layer is not formed.

24. A liquid crystal display apparatus comprising: a liquid crystal cell; a pair of polarizing plates disposed so as to interpose the liquid crystal cell; and the retardation optical element according to claim 20 disposed in between the liquid crystal cell and at least one of the pair of the polarizing plates.

25. A method for manufacturing a retardation optical element comprising: an alignment layer forming step of forming an alignment layer on a transparent base material; a coating step of coating a retardation layer forming coating solution, including a liquid crystal material having the cholesteric regularity for forming a cholesteric liquid crystal structure, on the alignment layer, in a state that a rubbing treatment is not subjected to the alignment layer; an alignment treatment step of subjecting an alignment treatment to the retardation layer formed on the alignment layer in the coating step; and a fixing step of fixing the cholesteric liquid crystal structure exhibited in a liquid crystal phase state in the retardation layer, by subjecting a solidifying treatment to the retardation layer aligned by the alignment treatment, so as to be fixed.

* * * * *